United States Patent
Seyama

(10) Patent No.: US 8,527,842 B2
(45) Date of Patent: Sep. 3, 2013

(54) RATE ADJUSTMENT APPARATUS AND METHOD, AND COMMUNICATION APPARATUS

(75) Inventor: Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 12/893,802

(22) Filed: Sep. 29, 2010

(65) Prior Publication Data

US 2011/0077018 A1    Mar. 31, 2011

(30) Foreign Application Priority Data

Sep. 30, 2009 (JP) .................................. 2009-228844

(51) Int. Cl.
*H03M 13/00* (2006.01)
*H04W 72/00* (2009.01)

(52) U.S. Cl.
USPC ..................... 714/774; 455/452.1; 455/452.2; 714/776

(58) Field of Classification Search
None
See application file for complete search history.

(56) References Cited

U.S. PATENT DOCUMENTS

| | | | |
|---|---|---|---|
| 6,744,744 | B1 | 6/2004 | Tong et al. |
| 7,860,186 | B2 * | 12/2010 | Yano et al. ..................... 375/298 |
| 8,181,099 | B2 * | 5/2012 | Miyazaki et al. ............. 714/801 |
| 2004/0264418 | A1 | 12/2004 | Chen et al. |
| 2005/0141549 | A1 | 6/2005 | Dottling et al. |
| 2005/0154954 | A1 | 7/2005 | Maru |
| 2012/0204083 | A1* | 8/2012 | Miyazaki et al. ............. 714/801 |

FOREIGN PATENT DOCUMENTS

| | | |
|---|---|---|
| JP | 2001-057521 | 2/2001 |
| JP | 2002-199048 A | 7/2002 |
| JP | 3624874 | 12/2004 |
| JP | 2005-529509 | 9/2005 |
| JP | 2008-311869 A | 12/2008 |
| WO | WO-2008/151981 | 12/2008 |

OTHER PUBLICATIONS

"3rd Generation Partnership Project; Technical Specification Group Radio Access Network; Multiplexing and channel coding (FDD) (Release 7)", 3GPP TS 25.212 V7.10.0 (Mar. 2009).

* cited by examiner

*Primary Examiner* — Guerrier Merant
(74) *Attorney, Agent, or Firm* — Fujitsu Patent Center

(57) ABSTRACT

A rate adjustment apparatus includes a first calculating section that calculates a first parameter for calculating judgment values used for judging whether puncturing or repetition is to be performed with respect to individual bits of input data, a second calculating section that sequentially calculates a second parameter for each of a plurality of processing units into which input data is divided, by computation using a recurrence equation obtained from a relationship between the judgment values corresponding to two processing units of the plurality of processing units, and an executing section that obtains the judgment values with respect to individual bits forming each of the processing units by using the first parameter and the second parameter respectively calculated by the first calculating section and the second calculating section, and executes deletion or addition of bits based on the obtained judgment values.

16 Claims, 29 Drawing Sheets

FIG.7

```
E(0) = e_ini
α(0) = 0
E_minus = (e_minus * B) mod e_plus
i = 1
do while i<L/B
    α(i) = α(i-1) + E_minus
    if α(i) >= e_plus then
        α(i) = α(i) - e_plus
    end if
    E(i) = e_ini - α(i)
    if E(i) <= 0 then
        E(i) = E(i) + e_plus
    end if
    i = i + 1
end do
```

FIG.9

| | CYCLE | 1 | 2 | 3 | 4 | 5 | 6 | 7 | 8 |
|---|---|---|---|---|---|---|---|---|---|
| BLOCK #0 | INPUT BIT INDEX | 0 | 1 | 2 | 3 | 4 | 5 | 6 | 7 |
| | e VALUE | -11 | 37 | 25 | 13 | 1 | -11 | 37 | 25 |
| BLOCK #1 | INPUT BIT INDEX | 8 | 9 | 10 | 11 | 12 | 13 | 14 | 15 |
| | e VALUE | 13 | 1 | -11 | 37 | 25 | 13 | 1 | -11 |
| BLOCK #2 | INPUT BIT INDEX | 16 | 17 | 18 | 19 | 20 | 21 | 22 | 23 |
| | e VALUE | 37 | 25 | 13 | 1 | -11 | 37 | 25 | 13 |
| BLOCK #3 | INPUT BIT INDEX | 24 | 25 | 26 | 27 | 28 | 29 | | |
| | e VALUE | 1 | -11 | 37 | 25 | 13 | 1 | | |

FIG.11

| | | 0 | 1 | 2 | 3 | 4 | 5 | 6 | 7 | 8 | 9 | 10 | ... | 19 | 20 | 21 |
|---|---|---|---|---|---|---|---|---|---|---|---|---|---|---|---|---|
| BLOCK #0 | OUTPUT BIT INDEX | 0 | 1 | 2 | 3 | 4 | 5 | 6 | 7 | 8 | 9 | 10 | ... | 19 | 20 | 21 |
| | INPUT BIT INDEX | 0 | 0 | 0 | 1 | 1 | 1 | 2 | 2 | 2 | 3 | 3 | ... | 7 | 7 | 7 |
| | e VALUE | -11 | -4 | 3 | -9 | -2 | 5 | -7 | 0 | 7 | -5 | 2 | ... | -11 | -4 | 3 |
| BLOCK #1 | OUTPUT BIT INDEX | 22 | 23 | 24 | 25 | 26 | 27 | 28 | 29 | 30 | 31 | 32 | ... | 41 | 42 | 43 |
| | INPUT BIT INDEX | 8 | 8 | 8 | 9 | 9 | 9 | 10 | 10 | 11 | 11 | 11 | ... | 15 | 15 | 15 |
| | e VALUE | -9 | -2 | 5 | -7 | 0 | 7 | -5 | 2 | -10 | -3 | 4 | ... | -9 | -2 | 5 |
| BLOCK #2 | OUTPUT BIT INDEX | 44 | 45 | 46 | 47 | 48 | 49 | 50 | 51 | 52 | 53 | 54 | ... | 63 | 64 | 65 |
| | INPUT BIT INDEX | 16 | 16 | 16 | 17 | 17 | 18 | 18 | 18 | 19 | 19 | 19 | ... | 23 | 23 | 23 |
| | e VALUE | -7 | 0 | 7 | -5 | 2 | -10 | -3 | 4 | -8 | -1 | 6 | ... | -7 | 0 | 7 |
| BLOCK #3 | OUTPUT BIT INDEX | 66 | 67 | 68 | 69 | 70 | 71 | | | 79 | 80 | 81 | | | | |
| | INPUT BIT INDEX | 24 | 24 | 25 | 25 | 25 | 26 | | | 29 | 29 | 29 | ... | | | |
| | e VALUE | 1 | -11 | 37 | 25 | 13 | 1 | | | -9 | -2 | 5 | | | | |

FIG.12

```
i = 0
if puncturing is to be performed
then
    do while i < L/B
        j = 0
        e = E(i)
        do while j < B
            e = e - e_minus
            if e <= 0 then
                puncture B*i+j th bit
                e = e + e_plus
            end if
            j = j + 1
        end do
        i = i + 1
    end do
else
    do while i < L/B
        j = 0
        e = E(i)
        do while j < B
            e = e - e_minus
            do while e <= 0
                repeat B*i+j th bit
                e = e + e_plus
            end do
            j = j + 1
        end do
        i = i + 1
    end do
end if
```

FIG.17

| | | | | | | | | | |
|---|---|---|---|---|---|---|---|---|---|
| BLOCK #0 | OUTPUT BIT INDEX | 0 | 1 | 2 | 3 | 4 | 5 | | |
| | INPUT BIT INDEX | 1 | 2 | 3 | 4 | 6 | 7 | | |
| BLOCK #1 | OUTPUT BIT INDEX | 6 | 7 | 8 | 9 | 10 | 11 | | |
| | INPUT BIT INDEX | 8 | 9 | 11 | 12 | 13 | 14 | | |
| BLOCK #2 | OUTPUT BIT INDEX | 12 | 13 | 14 | 15 | 16 | 17 | | |
| | INPUT BIT INDEX | 16 | 17 | 18 | 19 | 21 | 22 | | |
| BLOCK #3 | OUTPUT BIT INDEX | 19 | 20 | 21 | 22 | 23 | | | |
| | INPUT BIT INDEX | 24 | 26 | 27 | 28 | 29 | | | |

FIG.18

```
i = 0
if puncturing is to be performed then
    do while i < L/B
        j = 0
        k = 0
        e = E(i)
        do while j < B
            e = e - e_minus
            if e <= 0 then
                e = e + e_plus
            else
                rm_tbl( g(i) + k ) = B * i + j
                k = k + 1
            end if
            j = j + 1
        end do
        i = i + 1
    end do
else
    do while i < L/B
        j = 0
        k = 0
        e = E(i)
        do while j < B
            e = e - e_minus
            rm_tbl( g(i) + k ) = B * i + j
            k = k + 1
            do while e <= 0
                rm_tbl( g(i) + k ) = B * i + j
                k = k + 1
                e = e + e_plus
            end do
            j = j + 1
        end do
        i = i + 1
    end do
end if
```

FIG.21

```
β(0) = 0
j = 1
do while j<B
    β(j) = β(j-1) + e_minus
    if β(j)>=e_plus then
        β(j) = β(j) - e_plus
    end if
    j = j + 1
end do
```

FIG.22

```
i = 0
j = 0
if puncturing is to be performed then
    do while i<L/B
        do while j<B
            tmp = α(i) + β(j)
            if tmp>=e_plus then
                tmp = tmp - e_plus
            end if
            e = e_ini - tmp e = e - e_minus
            if e<=0 then
                puncture B*i+j th bit
            end if
            j=j+1
        end do
        i=i+1
    end do
else
    do while i<L/B
        do while j<B
            tmp = α(i) + β(j)
            if tmp>=e_plus then
                tmp = tmp - e_plus
            end if
            e = e_ini - tmp e = e - e_minus
            do while e<=0
                repeat B*i+j th bit
            end do
            j=j+1
        end do
        i=i+1
    end do
end if
```

FIG.26

```
i = 0
sum = 0
if puncturing is to be performed then
    do while i<L/B
        j = 0
        k = 0
        sum_blk = 0
        do while j<B
            if pattern(j)==1 then
                addr(sum+k) = B*i+j
                k = k + 1
            end if
            sum_blk = sum_blk + pattern(j)
            j = j + 1
        end do
        sum = sum + sum_blk
        i = i + 1
    end do
else
    do while i<L/B
        j = 0
        k = 0
        sum_blk = 0
        do while j<B
            l = 0
            do while l<=pattern(j)
                addr(sum(i-1)+k) = B*i+j
                k = k + 1
                l = l + 1
            end do
            sum_blk = sum_blk + pattern(j) + 1
            j = j + 1
        end do
        sum = sum + sum_blk
        i = i + 1
    end do
end if
```

FIG.28

```
i = 0
j = 0
if puncturing is to be performed
then
    do while i<L/B
        do while j<B
            tmp = α(i) + β(j)
            if tmp>=e_plus then
                tmp = tmp - e_plus
            end if
            if tmp<=e_minus then
                puncture B*i+j th bit
            end if
            j=j+1
        end do
        i=i+1
    end do
else
    do while i<L/B
        do while j<B
            tmp = α(i) + β(j)
            if tmp>=e_plus then
                tmp = tmp - e_plus
            end if
            if tmp<=e_minus then
                repeat B*i+j th bit
            end if
            j=j+1
        end do
        i=i+1
    end do
end if
```

RATE ADJUSTMENT APPARATUS AND METHOD, AND COMMUNICATION APPARATUS

CROSS-REFERENCE TO RELATED APPLICATIONS

This application is based upon and claims the benefit of priority of the prior Japanese Patent Application No. 2009-228844, filed on Sep. 30, 2009, the entire contents of which are incorporated herein by reference.

FIELD

The present invention relates to a rate adjustment apparatus, a rate adjustment method, and a communication apparatus.

BACKGROUND

Radio communication apparatuses such as a cell phone often adjust the rate of data to be transmitted in accordance with the transmission environment or the like. Specifically, for example, according to the High Speed Packet Access (HSPA) communication technology standardized by 3rd Generation Partnership Project (3GPP), when transmitting encoded data, a radio communication apparatus applies a rate matching process to the bit sequence obtained after error correction encoding. That is, in error correction according to HSPA, the transmitter generates two parity bits with respect to one information bit by using a turbo code with a coding rate of ⅓. Then, in the rate matching process, the transmitter performs thinning-out of bits (puncturing) from the error correction encoded bit sequence, or performs repeating of bits (repetition), depending on the quality of the propagation path. At the receiver, rate de-matching is performed. Rate-de-matching is a reverse process vis-à-vis the rate matching process of the transmitter. Rate de-matching produces a bit sequence upon which the receiver then performs error correction decoding.

In the rate matching process standardized by 3GPP, puncturing or repetition is to be performed by an algorithm using a parameter e used for judgment. That is, for puncturing, a predetermined decrement value $e_{minus}$ is sequentially subtracted from a judgment value e, and if the judgment value e becomes negative upon performing subtraction of the decrement value $e_{minus}$ m times (m is an integer larger than or equal to 1), the m-th bit is punctured, and an increment value $e_{plus}$ is added. For repetition, after subtracting a predetermined decrement value $e_{minus}$ from a judgment value e corresponding to a given bit, if the judgment value e becomes negative, a predetermined increment value $e_{plus}$ is sequentially added to the judgment value e, and until the judgment value e becomes positive, the same bit is repeated every time the increment value $e_{plus}$ is added (refer to 3GPP TS 25.212 V7.10.0, "Multiplexing and channel coding", 2009-3).

As described above, according to the above algorithm, whether or not a given bit is to be punctured or repeated depends on the judgment value e corresponding to the immediately preceding bit, and whether or not puncturing or repetition is performed is judged sequentially starting from the front bit of a bit sequence. Thus, the number of times a loop process is executed increases, which makes it difficult to make rate matching faster particularly in cases where the size of a transport block is large as in HSPA.

Accordingly, one approach being considered is to divide an inputted bit sequence into a plurality of blocks, calculate the judgment value e for the leading bit of each of blocks, and perform rate matching in parallel between individual blocks (for example, refer to Japanese Laid-open Patent Publication No. 2002-199048).

However, when performing rate matching in parallel, the resulting computations tend to become complex, leading to an increase in the amount of processing and circuit area. In this regard, to calculate the judgment value e for the leading bit of each block, Equation (1) below is used to find a judgment value e(m) for the m-th bit, for example.

$$e(m)=e_{ini}-[\{e_{minus}(m-1)\} \bmod e_{plus}], m=1,2,\ldots,L \quad (1)$$

It should be noted that $e_{ini}$ is the initial value of the judgment value e, and L is the size of an inputted bit sequence (i.e. the number of bits). If the judgment value e(m) obtained by Equation (1) is negative, a value obtained by adding an increment value $e_{plus}$ serves as the judgment value e(m). Now, Equation (1) includes modulo operation, and if the value of L is large, the number of digits of bits in the multiplication of $e_{minus}$ and (m−1) becomes large. Since such modulo operation and multiplication are complex computations in comparison to simple addition or subtraction, the amount of processing required for obtaining the judgment value e for the leading bit of a block is large. To perform computations requiring a large amount of processing at high speed, the required circuit area increases.

Another approach also being considered is to perform parallelization of rate matching by obtaining an adjustment value q(m) indicating the number of bits to be punctured or repeated up to the m-th bit by Equation (2) below. Equation (2) also includes division and multiplication, resulting in an increase in the amount of processing and circuit area (for example, refer to Japanese Laid-open Patent Publication No. 2008-311869).

$$q(m) = \left\lceil \frac{m \cdot e_{minus} - e_{ini} + 1}{e_{plus}} \right\rceil \quad (2)$$

SUMMARY

According to an aspect of the invention, a rate adjustment apparatus includes a first calculating section that calculates a first parameter for calculating judgment values used for judging whether puncturing or repetition is to be performed with respect to individual bits of input data, a second calculating section that sequentially calculates a second parameter for each of a plurality of processing units into which input data is divided, by computation using a recurrence equation obtained from a relationship between the judgment values corresponding to two processing units of the plurality of processing units, and an executing section that obtains the judgment values with respect to individual bits forming each of the processing units by using the first parameter and the second parameter respectively calculated by the first calculating section and the second calculating section, and executes deletion or addition of bits based on the obtained judgment values.

The object and advantages of the invention will be realized and attained by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of leading parameter calculation algorithm;

FIG. 9 is a diagram illustrating a specific example of puncturing process;

FIG. 11 is a diagram illustrating a specific example of repetition process;

FIG. 12 is a diagram illustrating an example of bit processing algorithm according to Embodiment 1;

FIG. 17 is a diagram illustrating a specific example of pattern determination process;

FIG. 18 is a diagram illustrating an example of algorithm for a pattern determination process;

FIG. 21 is a diagram illustrating an example of algorithm for parameter calculation;

FIG. 22 is a diagram illustrating an example of bit processing according to Embodiment 3;

FIG. 26 is a diagram illustrating an example of algorithm for address calculation process;

FIG. 28 is a diagram illustrating an example of algorithm for bit processing according to Embodiment 5.

DESCRIPTION OF EMBODIMENTS

Hereinbelow, embodiments of a rate adjustment apparatus, a rate adjustment method, and a rate adjusting program disclosed by the present application will be described in detail with reference to the drawings. It should be noted that the present invention is not to be limited by these embodiments.

Embodiment 1

Figure 1:
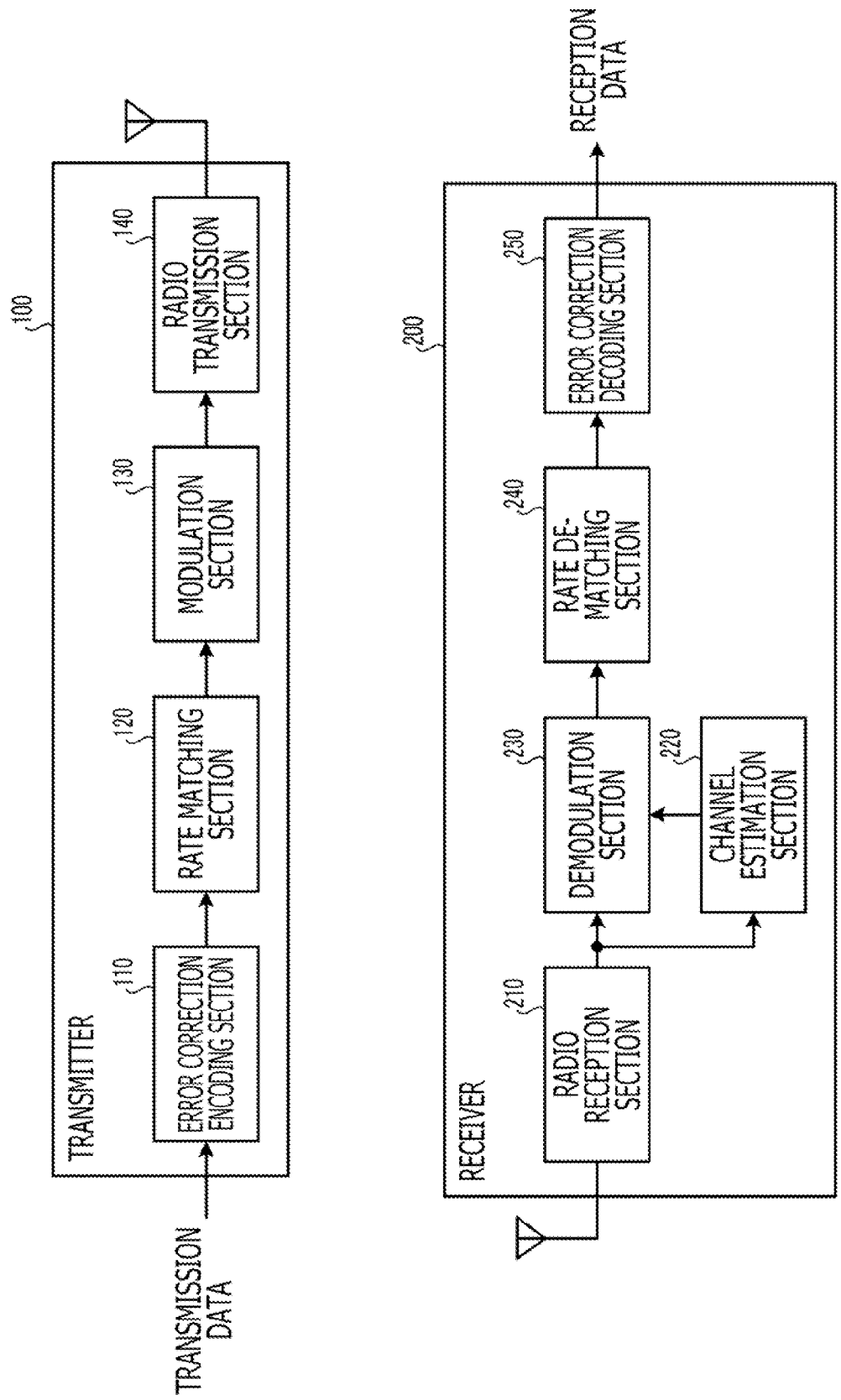
FIG. 1 is a diagram illustrating an exemplary configuration of a communication system according to Embodiment 1.

FIG. 1 is a diagram illustrating an exemplary configuration of a communication system according to Embodiment 1. As illustrated in FIG. 1, in the communication system according to this embodiment, a transmitter 100 and a receiver 200 perform radio communication. Specifically, the transmitter 100 has an error correction encoding section 110, a rate matching section 120, a modulation section 130, and a radio transmission section 140. The receiver 200 has a radio reception section 210, a channel estimation section 220, a demodulation section 230, a rate de-matching section 240, and an error correction decoding section 250.

The error correction encoding section 110 performs error correction encoding on transmission data, and outputs the resulting encoded data to the rate matching section 120. Specifically, the error correction encoding section 110 adds parity bits to the information bits of the encoded data, and outputs the resulting bit sequence to the rate matching section 120 as encoded data.

The rate matching section 120 performs puncturing or repetition on the bit sequence of the encoded data outputted from the error correction encoding section 110 to thereby adjust the rate, and outputs the resulting adjusted data to the modulation section 130. At this time, the rate matching section 120 divides the encoded data into a plurality of blocks, sequentially calculates leading parameters with respect to the leading bits of the respective blocks by using recurrence equations, and executes rate matching for each block in a parallel fashion based on the leading parameters. Although described later in detail, since the rate matching section 120 uses recurrence equations to calculate the leading parameters, it is possible to reduce or minimize an increase in the amount of processing at the time of rate matching.

The modulation section 130 modulates the adjusted data outputted from the rate matching section 120, and outputs the resulting modulated data to the radio transmission section 140. The radio transmission section 140 applies radio transmission processing (D/A conversion, up-conversion, etc.) to the modulated data outputted from the modulation section 130, and transmits the resulting radio signal via an antenna. The transmitted radio signal is received by the receiver 200.

That is, the radio reception section 210 receives the radio signal via the antenna, and applies radio reception processing (down-conversion, A/D conversion, etc.) to the received signal. Then, the radio reception section 210 outputs the received signal to the channel estimation section 220 and the demodulation section 230.

The channel estimation section 220 performs channel estimation with respect to the received signal, and obtains a channel estimation value corresponding to phase fluctuation and amplitude fluctuation on the propagation path. Then, the channel estimation section 220 outputs the obtained channel estimation value to the demodulation section 230.

The demodulation section 230 demodulates the received signal by using the channel estimation value outputted from the channel estimation section 220, and outputs the obtained demodulated data to the rate de-matching section 240. Specifically, the demodulation section 230 outputs a bit sequence obtained by the demodulation to the rate de-matching section 240 as demodulated data.

The rate de-matching section 240 performs a process reverse to that of the rate matching section 120 on the bit sequence of the demodulated data outputted from the demodulation section 230 to recover the rate, and outputs the obtained recovered data to the error correction decoding section 250. At this time, like the rate matching section 120, the rate de-matching section 240 divides the demodulated data into a plurality of blocks, sequentially calculates leading parameters with respect to the leading bits of the respective blocks by using recurrence equations, and execute rate de-matching for each block in a parallel fashion based on the leading parameters.

The error correction decoding section 250 performs error correction decoding on the recovered data outputted from the rate de-matching section 240, and outputs reception data. That is, the error correction decoding section 250 correct errors in information bits by using parity bits, and outputs the error-corrected information bits as reception data.

Figure 2:
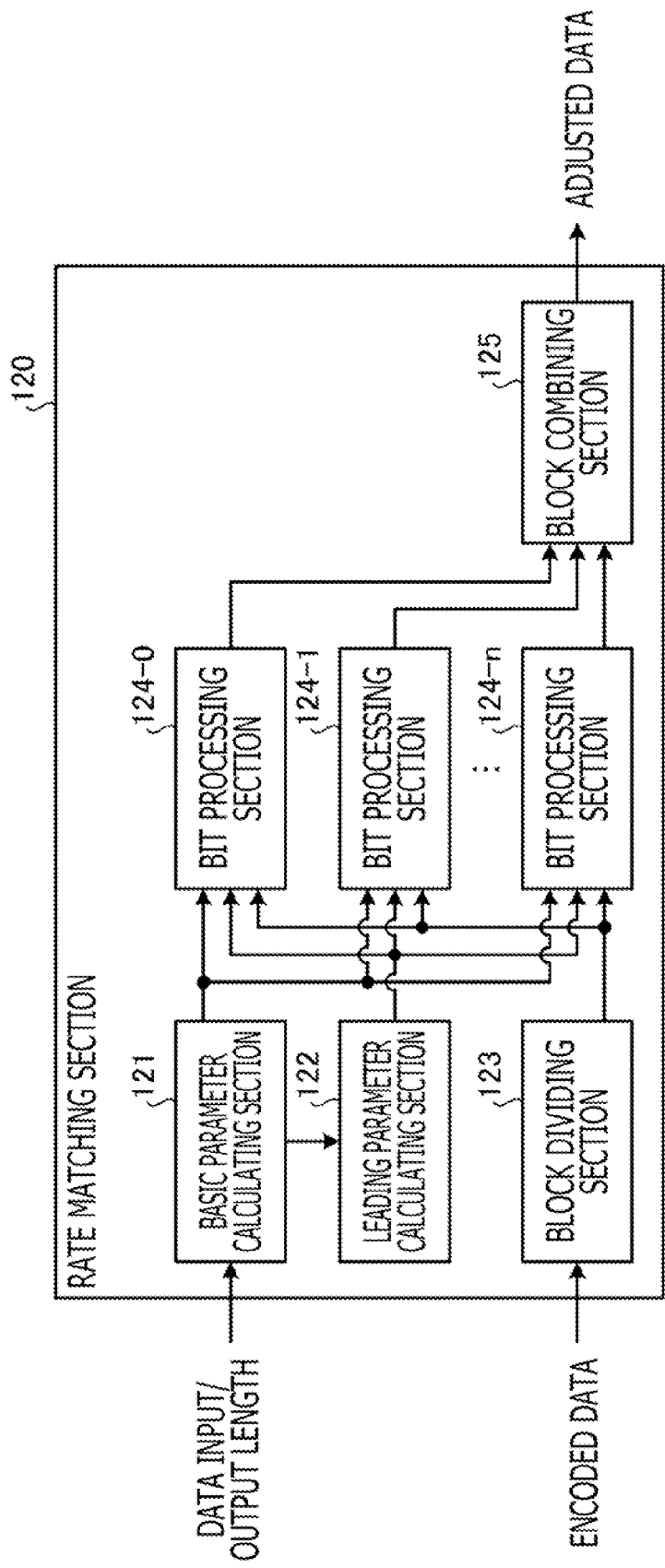
FIG. 2 is a block diagram illustrating an exemplary configuration of a rate matching section according to Embodiment 1.

FIG. 2 is a block diagram illustrating an exemplary configuration of the rate matching section 120 according to this embodiment. The rate matching section 120 illustrated in FIG. 2 has a basic parameter calculating section 121, a leading parameter calculating section 122, a block dividing section 123, bit processing sections 124-0 to n (n is an integer larger than or equal to 1), and a block combining section 125.

The basic parameter calculating section 121 calculates basic parameters used for a rate matching process, from the data length of encoded data inputted to the rate matching section 120, the data length of adjusted data outputted from the rate matching section 120, and the like. Specifically, the basic parameter calculating section 121 calculates an initial value $e_{ini}$, an increment value $e_{plus}$, and a decrement value $e_{minus}$ for a judgment value e specified in the 3GPP specification.

The leading parameter calculating section 122 calculates the judgment value e with respect to the leading bits of each of a plurality of blocks obtained by dividing encoded data. Specifically, the leading parameter calculating section 122 calculates a judgment value E(i) of the leading bit of the i-th block (hereinafter, referred to as "leading judgment value") by using recurrence equations (3) and (4) below:

$$E(i+1) = e_{ini} - \alpha(i+1) \quad (3)$$

$$\alpha(i+1) = [\alpha(i) + E_{minus}] \bmod e_{plus} \quad (4)$$

where $E(0) = e_{ini}$ and $\alpha(0) = 0$. Also, letting the size (i.e. the number of bits) of a block be B, $E_{minus}$ is defined as Equation (5) below.

$$E_{minus} = (e_{minus} \cdot B) \bmod e_{plus} \quad (5)$$

Therefore, $\alpha(i+1)$ and $E_{minus}$ are each the remainder when a given value is divided by the increment value $e_{plus}$, and hence smaller than the increment value $e_{plus}$. From this, it is appreciated that $[\alpha(i) + E_{minus}]$ on the right side of Equation (4) does not exceed twice of the increment value $e_{plus}$ at maximum. Then, since the right side of Equation (4) is the remainder when $[\alpha(i) + E_{minus}]$ not exceeding twice of the increment value $e_{plus}$ is divided by the increment value $e_{plus}$, if $[\alpha(i) + E_{minus}]$ is smaller than or equal to the increment value $e_{plus}$, then the value of $\alpha(i+1)$ is equal to $[\alpha(i) + E_{minus}]$ itself, and if $[\alpha(i) + E_{minus}]$ is larger than the increment value $e_{plus}$, $\alpha(i+1)$ is a value equal to $[\alpha(i) + E_{minus}]$ minus the increment value $e_{plus}$. In other words, by using Equations (3) and (4), the leading parameter calculating section 122 calculates the leading judgment value E(i) of each block by comparative magnitude judgment and subtraction, instead of performing a modulo operation.

Here, the method of deriving Equations (3) and (4) above will be described. As described above, the judgment value e(m) for the m-th bit is obtained by Equation (1). When the range of m in Equation (1) is changed to 0 to L−1, Equation (1) is expressed as Equation (6) below.

$$e(m) = e_{ini} - [\{e_{minus} \cdot m\} \bmod e_{plus}], m = 0, 1, \ldots, L-1 \quad (6)$$

Incidentally, decomposing the index m of a bit by using the number i of a block and the index j of a bit within the block yields the following:

$$m = B \cdot i + j$$

i = 0, 1, ..., ceil(L/B)

j = 0, 1, ..., B−1, where L represents the size (i.e. the number of bits) of encoded data, and ceil(x) is called a ceil function and represents the smallest integer larger than or equal to x. Substituting this m into Equation (6) yields the following transformation:

$$e(m) = e(B \cdot i + j) \quad (7)$$
$$= e_{ini} - [\{e_{minus} \cdot (B \cdot i + j)\} \bmod e_{plus}]$$
$$= e_{ini} - [\{e_{minus} \cdot B \cdot i + e_{minus} \cdot j\} \bmod e_{plus}].$$

For the leading bit of each block, the index j of the bit within the block is 0, so Equation (7) may be further transformed as Equation (8) below.

$$E(i) = e(B \cdot i) \quad (8)$$
$$= e_{ini} - [\{e_{minus} \cdot B \cdot i\} \bmod e_{plus}]$$

In Equation (8), if the term with respect to i is rearranged as $\alpha(i)$, and $E_{minus}$ indicated in Equation (5) above is used, Equations (3) and (4) above may be obtained from Equation (8).

The block dividing section 123 divides encoded data of L bits into a plurality of blocks of B bits, and outputs the obtained blocks to the respective bit processing sections 124-0 to 124-n.

The bit processing sections 124-0 to 124-n perform puncturing or repetition on the bits of the corresponding blocks to perform rate adjustment. At this time, the bit processing sections 124-0 to 124-n determine the bits to be punctured or repeated by using the increment value $e_{plus}$ and the decrement value $e_{minus}$ calculated by the basic parameter calculating section 121, and the leading judgment value E(i) calculated for each of the blocks by the leading parameter calculating section 122.

That is, when performing puncturing, the bit processing sections 124-0 to 124-n each sequentially subtract the decrement value $e_{minus}$ with the initial value of the judgment value e as E(i), and find the judgment value e corresponding to each individual bit within the corresponding block. Then, when the judgment value e becomes negative, the bit processing sections 124-0 to 124-n puncture the corresponding bits. Also, when performing repetition, after subtracting the decrement value $e_{minus}$ with the initial value of the judgment value e as E(i), the bit processing sections 124-0 to 124-n each sequentially add the increment value $e_{plus}$ to the judgment value e. Then, until the judgment value e becomes positive, the bit processing sections 124-0 to 124-n may each repeat the same bit every time the increment value $e_{plus}$ is added.

The block combining section 125 combines the blocks respectively punctured or repeated by the bit processing sections 124-0 to 124-n, and outputs the result as adjusted data whose rate has been adjusted.

Figure 3:
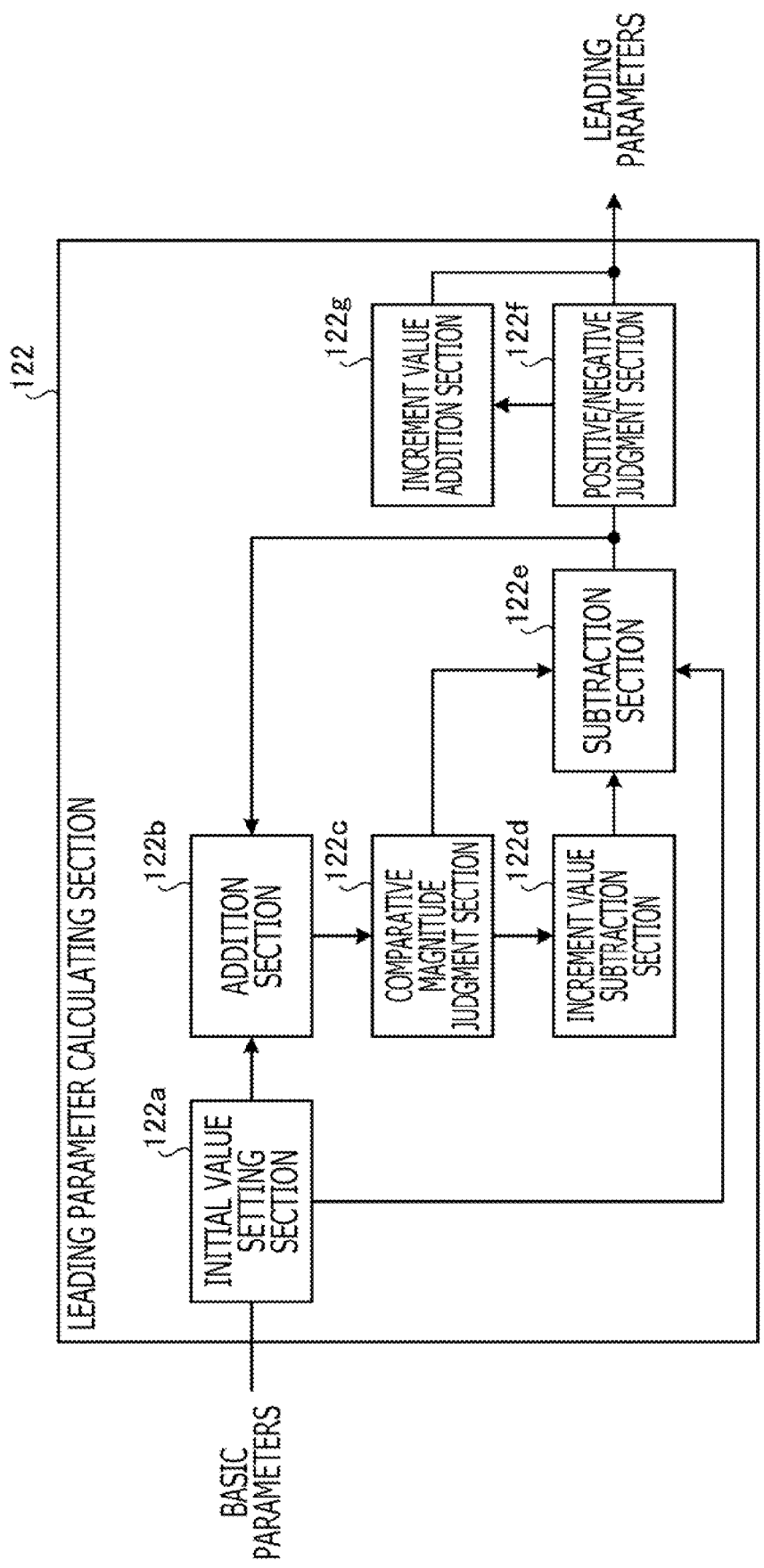
FIG. 3 is a block diagram illustrating an exemplary configuration of a leading parameter calculating section according to Embodiment 1.

FIG. 3 is a block diagram illustrating an exemplary configuration of the leading parameter calculating section 122 according to this embodiment. The leading parameter calculating section 122 illustrated in FIG. 3 has an initial value setting section 122a, an addition section 122b, a comparative magnitude judgment section 122c, an increment value subtraction section 122d, a subtraction section 122e, a positive/negative judgment section 122f, and an increment value addition section 122g.

The initial value setting section 122a sets an initial value used for calculating the leading judgment value E(i) of each block from the initial value $e_{ini}$, the increment value $e_{plus}$, and the decrement value $e_{minus}$ calculated by the basic parameter calculating section 121. Specifically, the initial value setting section 122a sets the leading judgment value E(0) of the beginning block (the zeroth block) to the initial value $e_{ini}$, and sets the initial value α(0) of α(i) indicated in Equations (3) and (4) above to 0. Further, the initial value setting section 122a calculates $E_{minus}$ indicated in Equation (5) above in advance. Then, the initial value setting section 122a outputs $E_{minus}$ to the addition section 122b, and outputs α(0) and the leading judgment value E(0) to the subtraction section 122e.

The addition section 122b adds $E_{minus}$ outputted from the initial value setting section 122a, and α(i) fed back from the subtraction section 122e together, and outputs the addition result to the comparative magnitude judgment section 122c. That is, the addition section 122b calculates [α(i)+$E_{minus}$] on the right side of Equation (4). Therefore, as described above, the addition result of the addition section 122b does not exceed twice of the increment value $e_{plus}$ at maximum.

The comparative magnitude judgment section 122c judges the comparative magnitudes of the addition result obtained by the addition section 122b and the increment value $e_{plus}$, and if the addition result is larger than or equal to the increment value $e_{plus}$, the comparative magnitude judgment section 122c outputs the addition result to the increment value subtraction section 122d. On the other hand, if, as a result of the comparative magnitude judgment, the addition result is smaller than the increment value $e_{plus}$, the comparative magnitude judgment section 122c outputs the addition result as α(i+1) obtained from Equation (4), to the subtraction section 122e.

The increment value subtraction section 122d subtracts the increment value $e_{plus}$ from the output of the comparative magnitude judgment section 122c, and outputs the obtained subtraction result to the subtraction section 122e as α(i+1) obtained from Equation (4). In this way, in this embodiment, the modulo operation included in Equation (4) may be executed by comparative magnitude judgment and subtraction by the comparative magnitude judgment section 122c and the increment value subtraction section 122d, respectively, without performing division.

When α(0) and the leading judgment value E(0) are outputted from the initial value setting section 122a, the subtraction section 122e outputs the leading judgment value E(0) to the positive/negative judgment section 122f, and feeds back α(0) to the addition section 122b. Also, when α(i+1) is outputted from the comparative magnitude judgment section 122c or the increment value subtraction section 122d, the subtraction section 122e subtracts α(i+1) from the initial value $e_{ini}$ and outputs the subtraction result as E(i+1) to the positive/negative judgment section 122f, and also feeds back α(i+1) to the addition section 122b. That is, the subtraction section 122e performs the computation of Equation (3), and also feeds back α(i+1) for calculation of α(i+2).

The positive/negative judgment section 122f outputs the leading judgment value E(0) outputted from the subtraction section 122e, to the bit processing section 124-0 as the parameter of the leading bit of the beginning block (the zeroth block). Also, the positive/negative judgment section 122f judges whether E(i+1) outputted from the subtraction section 122e is positive or negative. If E(i+1) is positive, the positive/negative judgment section 122f outputs the leading judgment value E(i+1) to a bit processing section 124-(i+1) (where i+1≦n) as the parameter of the leading bit of the (i+1)-th block. On the other hand, if it is judged as a result of the positive/negative judgment that E(i+1) is negative, the positive/negative judgment section 122f outputs the leading judgment value E(i+1) to the increment value addition section 122g.

When the leading judgment value E(i+1) is outputted from the positive/negative judgment section 122f, the increment value addition section 122g adds the increment value $e_{plus}$ to the leading judgment value E(i+1), and outputs the obtained addition result to the bit processing section 124-(i+1) as the leading judgment value E(i+1).

In this way, the leading parameter calculating section 122 according to this embodiment sequentially obtains the leading judgment value E(i) of each block by using the recurrence equations (3) and (4) described above. At this time, the modulo operation included in Equation (4) may be executed by comparative magnitude judgment and subtraction by the comparative magnitude judgment section 122c and the increment value subtraction section 122d, respectively, without performing division. Also, since $E_{minus}$ is calculated in advance by performing the computation of Equation (5) once by the initial value setting section 122a, complex computations when calculating the leading judgment value E(i) may be omitted.

Figure 4:
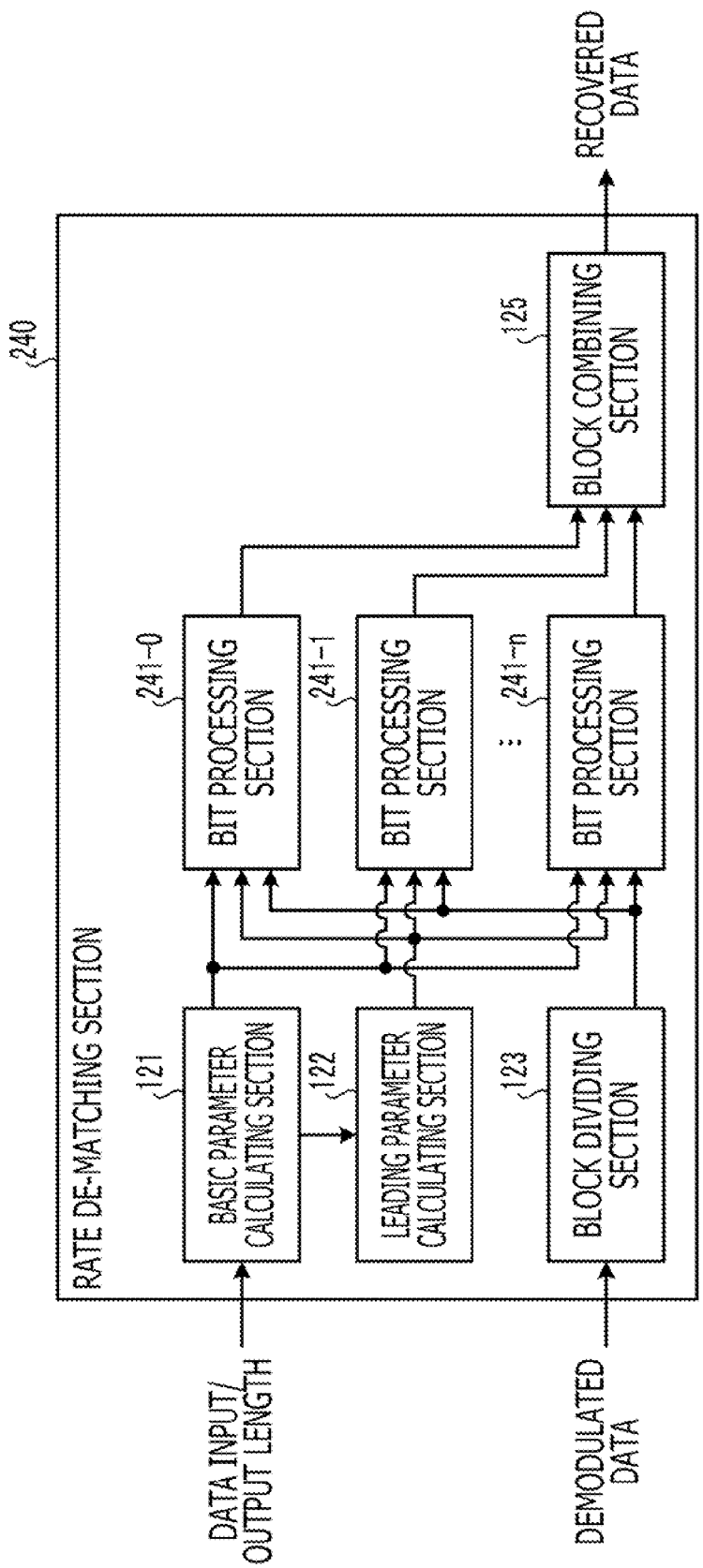
FIG. 4 is a block diagram illustrating an exemplary configuration of a rate de-matching section according to Embodiment 1.

FIG. 4 is a block diagram illustrating an exemplary configuration of the rate de-matching section 240 according to this embodiment. In FIG. 4, portions that are the same as those in FIG. 2 are denoted by the same symbols, and description thereof is omitted. The rate de-matching section 240 illustrated in FIG. 4 has the basic parameter calculating section 121, the leading parameter calculating section 122, the block dividing section 123, bit processing sections 241-0 to 241-n, and the block combining section 125.

The bit processing sections 241-0 to 241-n each perform de-puncturing or de-repetition that is the reverse of puncturing or repetition on the bits of the corresponding block, and recover the rate before the puncturing or repetition at the transmitter 100. At this time, the bit processing sections 241-0 to 241-n determine the bits to be de-punctured or de-repeated, by using the increment value $e_{plus}$ and the decrement value $e_{minus}$ calculated by the basic parameter calculating section 121, and the leading judgment value E(i) calculated for each of the blocks by the leading parameter calculating section 122.

That is, when performing de-puncturing, the bit processing sections 241-0 to 241-n each determine the position to be de-punctured by performing the same judgment as that when determining the bits to be punctured, and insert dummy bits to the determined target position. Also, when performing de-repetition, the bit processing sections 241-0 to 241-n each determine the bits to be de-repeated by performing the same judgment as that when determining the bits to be repeated, and combine the determined target bits.

It should be noted that since demodulated data outputted from the demodulation section 230 is inputted to the rate de-matching section 240, the block dividing section 123 illustrated in FIG. 4 divides the demodulated data into a plurality of blocks. Also, the block combining section 125 illustrated in FIG. 4 outputs recovered data obtained by recovering the rate before puncturing or repetition at the transmitter 100.

Figure 5:
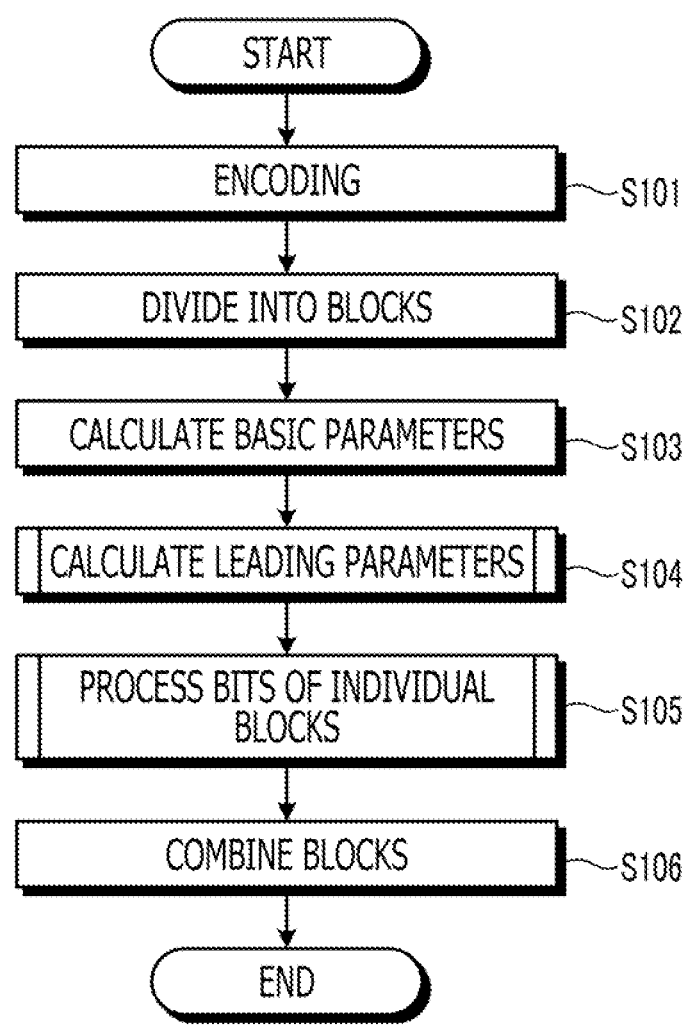
FIG. 5 is a flowchart illustrating an exemplary rate adjustment process according to Embodiment 1.

Next, a rate adjustment process in the transmitter 100 configured as mentioned above will be described with reference to the flowchart illustrated in FIG. 5. It should be noted that although de-puncturing or de-repetition is performed instead of puncturing or repetition in a rate adjustment process in the receiver 200, since the basic procedure may be the same as the rate adjustment process in the transmitter 100, description thereof is omitted.

As transmission data undergoes error correction encoding by the error correction encoding section 110 (step S101), parity bits are appended to the information bits of the transmission data. At this time, for example, in the case of error correction encoding with a ⅓ coding rate, two parity bits are appended to one information bit. Then, the bit sequence of encoded data obtained by the error correction encoding is inputted to the rate matching section 120, and is divided by the block dividing section 123 into a plurality of blocks (step S102). That is, the bit sequence of encoded data of L bits is divided by the block dividing section 123 into a plurality of blocks of B bits. The plurality of blocks obtained by the division are outputted to the respective bit processing sections 124-0 to 124-n.

On the other hand, from the input/output length of data indicating to what extent the rate of encoded data of L bits is to be adjusted, the initial value $e_{ini}$, the increment value $e_{plus}$, and the decrement value $e_{minus}$ specified by 3GPP are calculated by the basic parameter calculating section 121 as basic parameters (step S103). The calculated basic parameters are outputted to the leading parameter calculating section 122 and the bit processing sections 124-0 to 124-n, and parameters with respect to the leading bits of individual blocks are calculated by the leading parameter calculating section 122 (step S104). That is, the recurrence equations (3) and (4) are used by the leading parameter calculating section 122 to sequentially calculate $\alpha(i)$ and the leading judgment value E(i) of each block. Each calculated leading judgment value E(i) is outputted to the corresponding bit processing section 124-i ($0 \leq i \leq n$).

Then, by each of the bit processing sections 124-0 to 124-n, targets are determined by computation using the leading judgment value E(i), the increment value $e_{plus}$, and the decrement value $e_{minus}$, and puncturing or repetition of each individual bit within the corresponding block is performed (step S105). Each punctured or repeated block is outputted to the block combining section 125, and a plurality of such blocks are combined by the block combining section 125 (step S106), thereby outputting adjusted data whose rate has been adjusted.

Figure 6:
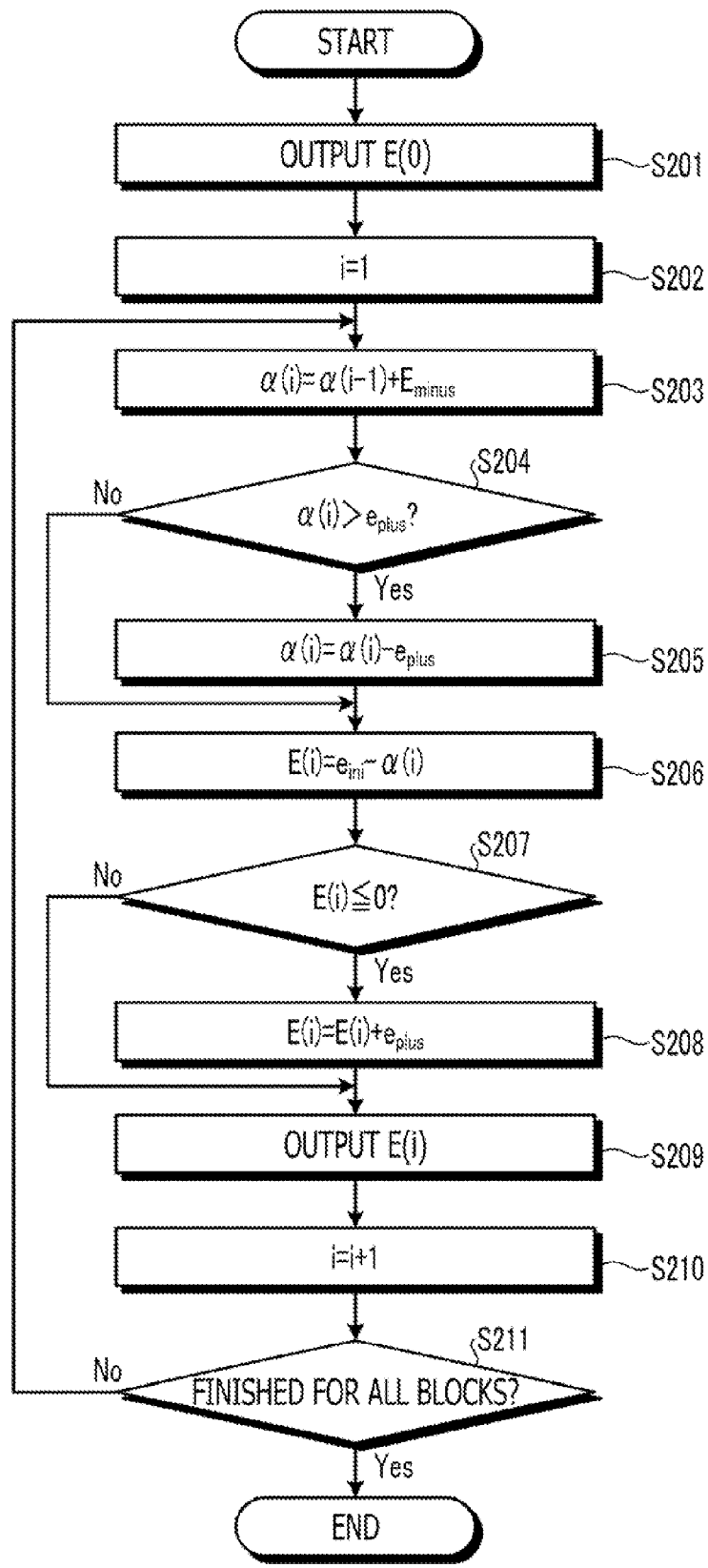
FIG. 6 is a flowchart illustrating an exemplary leading parameter calculation process.

Next, an exemplary leading parameter calculation process according to this embodiment will be described with reference to the flowchart illustrated in FIG. 6 with reference to FIGS. 2-3. In the following description, a plurality of blocks are indexed by i. It should be noted, however, that since the beginning block is the zeroth block, the index i of the beginning block is 0.

When basic parameters calculated by the basic parameter calculating section 121 are inputted to the initial value setting section 122a, the initial value setting section 122a sets the leading judgment value E(0) of the beginning block to the initial value $e_{ini}$, and sets $\alpha(0)$ to 0. Also, the initial value setting section 122a calculates $E_{minus}$ from the number of bits within the block, and the increment value $e_{plus}$ and the decrement value $e_{minus}$. Then, the leading judgment value E(0) is outputted to the bit processing section 124-0 via the subtraction section 122e and the positive/negative judgment section 122f (step S201). At the same time, $\alpha(0)$ is fed back to the addition section 122b.

Also, when $E_{minus}$ calculated by the initial value setting section 122a is outputted to the addition section 122b, the index i is incremented to 1 (step S202), and calculation of the leading parameter of the first block is started. That is, the addition section 122b adds $\alpha(0)$ fed back from the subtraction section 122e and $E_{minus}$ outputted from the initial value setting section 122a together to calculate $\alpha(1)$ (step S203). The addition result $\alpha(1)$ is outputted to the comparative magnitude judgment section 122c, and the comparative magnitudes of $\alpha(1)$ and the increment value $e_{plus}$ are judged by the comparative magnitude judgment section 122c (step S204).

Then, if $\alpha(1)$ is larger than the increment value $e_{plus}$ as a result of the comparative magnitude judgment (Yes in step S204), $\alpha(1)$ is outputted to the increment value subtraction section 122d, and the increment value $e_{plus}$ is subtracted from $\alpha(1)$ by the increment value subtraction section 122d (step S205). The new $\alpha(1)$ obtained by the subtraction is outputted to the subtraction section 122e. On the other hand, if $\alpha(1)$ is smaller than or equal to the increment value $e_{plus}$ as a result of the comparative magnitude judgment (No in step S204), $\alpha(1)$ is outputted to the subtraction section 122e as it is.

When $\alpha(1)$ is outputted to the subtraction section 122e, the computation of Equation (3) is performed by the subtraction section 122e (step S206), and the leading judgment value E(1) of the first block is calculated. Then, $\alpha(1)$ is fed back to the addition section 122b, and the calculated leading judgment value E(1) is outputted to the positive/negative judgment section 122f for positive/negative judgment (step S207).

If, as a result of the positive/negative judgment, the leading judgment value E(1) is negative (Yes in step S207), the leading judgment value E(1) is outputted to the increment value addition section 122g, and the increment value $e_{plus}$ is added to the leading judgment value E(1) by the increment value addition section 122g (step S208). The new E(1) obtained by the addition is outputted to the bit processing section 124-1 as a judgment value for the leading bit of the first block (step S209). On the other hand, if, as a result of the positive/negative judgment, the leading judgment value E(1) is positive (No in step S207), the leading judgment value E(1) is outputted to the bit processing section 124-1 as it is (step S209).

Since the leading judgment value E(1) of the first block has been thus calculated, the index i is incremented (step S210), and it is judged whether or not calculation of the leading judgment value E(i) is completed for all of the blocks obtained by the block dividing section 123 (step S211). If it is judged as a result that a block for which calculation of the leading judgment value E(i) is not completed still exists (No in step S211), $\alpha(2)$ is subsequently calculated, and E(2) is calculated from $\alpha(2)$ thus calculated (steps S203 to S209). If calculation of the leading judgment value E(i) is complete for all the blocks (Yes in step S211), the leading parameter calculation process ends.

The above calculation of the leading parameter by the leading parameter calculating section 122 may be also implemented by, for example, the algorithm illustrated in FIG. 7. In the algorithm illustrated in FIG. 7, although the leading parameter calculating section 122 performs multiplication and modulo operation once, subsequently, the leading parameter calculating section 122 calculates the leading judgment value E(i) of each individual block by comparative magnitude judgment, and addition and subtraction. Therefore, an increase in the amount of processing and circuit area in the leading parameter calculating section 122 may be reduced or minimized.

Next, a puncturing process and a repetition process as specific examples of bit processing according to this embodiment will be described with reference to FIGS. 8 to 11. In the following description, each bit within a block is indexed by j. It should be noted, however, that since the leading bit is the zeroth bit, the index j of the leading bit is 0. Also, the following processing is assumed to be bit processing with respect to the i-th block, and executed by the bit processing section 124-i.

Figure 8:
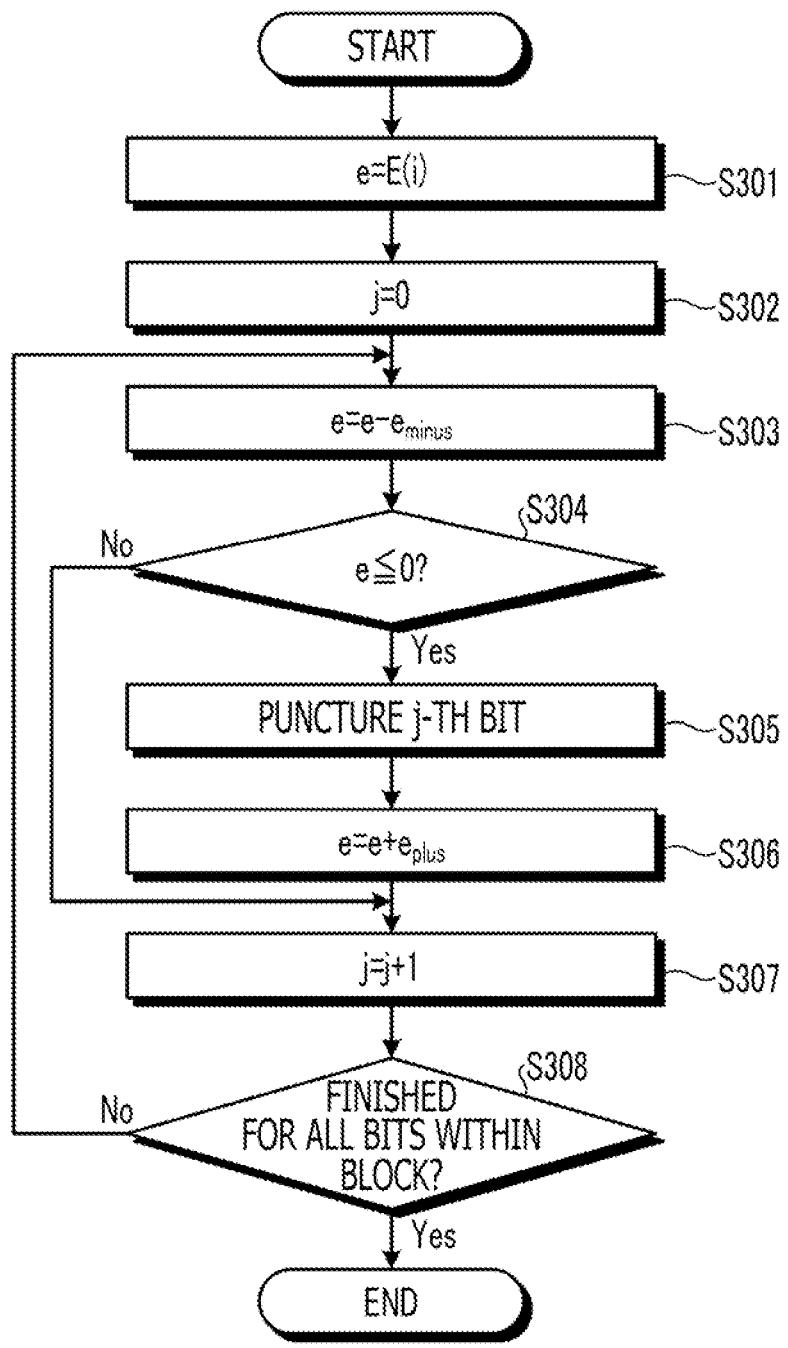
FIG. 8 is a flowchart illustrating an exemplary puncturing process.

FIG. 8 is a flowchart illustrating an exemplary puncturing process. As illustrated in FIG. 8 and with reference to FIG. 2, when the leading judgment value E(i) calculated by the leading parameter calculating section 122 is inputted to the bit processing section 124-i, the initial value of the judgment value e is set to the leading judgment value E(i) (step S301). Also, the index j is set to 0 (step S302), and the decrement value $e_{minus}$ is subtracted from the judgment value e (step S303). Then, it is judged whether or not the judgment value e after the subtraction is smaller than or equal to 0 (step S304). If the judgment value e is smaller than or equal to 0 (Yes in step S304), the j-th (the zeroth in this example) bit is punctured (step S305). Also, the judgment value e is updated by addition of the increment value $e_{plus}$ (step S306), and the index j is incremented by 1 (step S307). On the other hand, if the judgment value e after the subtraction of the decrement value $e_{minus}$ is larger than 0 (No in step S304), the index j is incremented by 1 without puncturing the j-th (the zeroth in this example) bit (step S307).

Upon incrementing the index j by 1, it is judged whether or not a bit corresponding to the index j exists within the block. In other words, it is judged whether or not the judgment of whether or not puncturing is to be performed has been finished for all of bits within the block (step S308). If it is judged as a result that there still exists a bit for which the judgment of whether or not puncturing is to be performed has not been finished (No in step S308), the decrement value $e_{minus}$ is subtracted from the current judgment value e again, and it is judged whether or not the j-th bit is to be punctured (steps S303 to S306). If it is judged that a bit corresponding to the index j does not exist within the block, (Yes in step S308), the puncturing process ends.

FIG. 9 illustrates an example of the case in which the above-mentioned puncturing process is executed with respect to four blocks #0 to #3 outputted from the block dividing section 123. In the example illustrated in FIG. 9, it is assumed that the number of bits L of encoded data is 30, the number of bits B of each block is 8, the initial value $e_{minus}$ is 1, the increment value $e_{plus}$ is 60, and the decrement value $e_{minus}$ is 12. In FIG. 9, directing attention to, for example, the block #0, for the input bit index j=0, the judgment value e is −11(<0) since the judgment value e has been updated by subtracting the decrement value $e_{minus}$ from the leading judgment value E(0)=$e_{ini}$. Therefore, the zeroth input bit is punctured. At the same time, the increment value $e_{plus}$ is added to the judgment value e, updating the judgment value e to 49.

Then, when the input bit index j=1, the decrement value $e_{minus}$ is subtracted from the judgment value e, updating the judgment value e to 37(>0). Therefore, the first input bit is not punctured. Subsequently, when the input bit index j=2, the decrement value $e_{minus}$ is subtracted from the judgment value e, updating the judgment value e to 25(>0). Therefore, the second input bit is not punctured. Thereafter, the same processing is repeated, and the judgment value e becomes negative again when the input bit index j=5, so the fifth input bit is punctured. The same processing is performed for the other blocks #1 to #3 as well, so that the hatched bits in FIG. 9 are punctured in the respective blocks.

In this way, whether or not each individual input bit within the blocks #0 to #3 is to be punctured may be sequentially judged based on the leading judgment values E(0) to E(3) of the blocks #0 to #3. Since whether or not puncturing is to be performed may be judged independently with respect to each block, the bit processing sections 124-0 to 124-3 execute puncturing processes with respect to the respective blocks in parallel. As a result, rate adjustment may be made faster.

Figure 10:
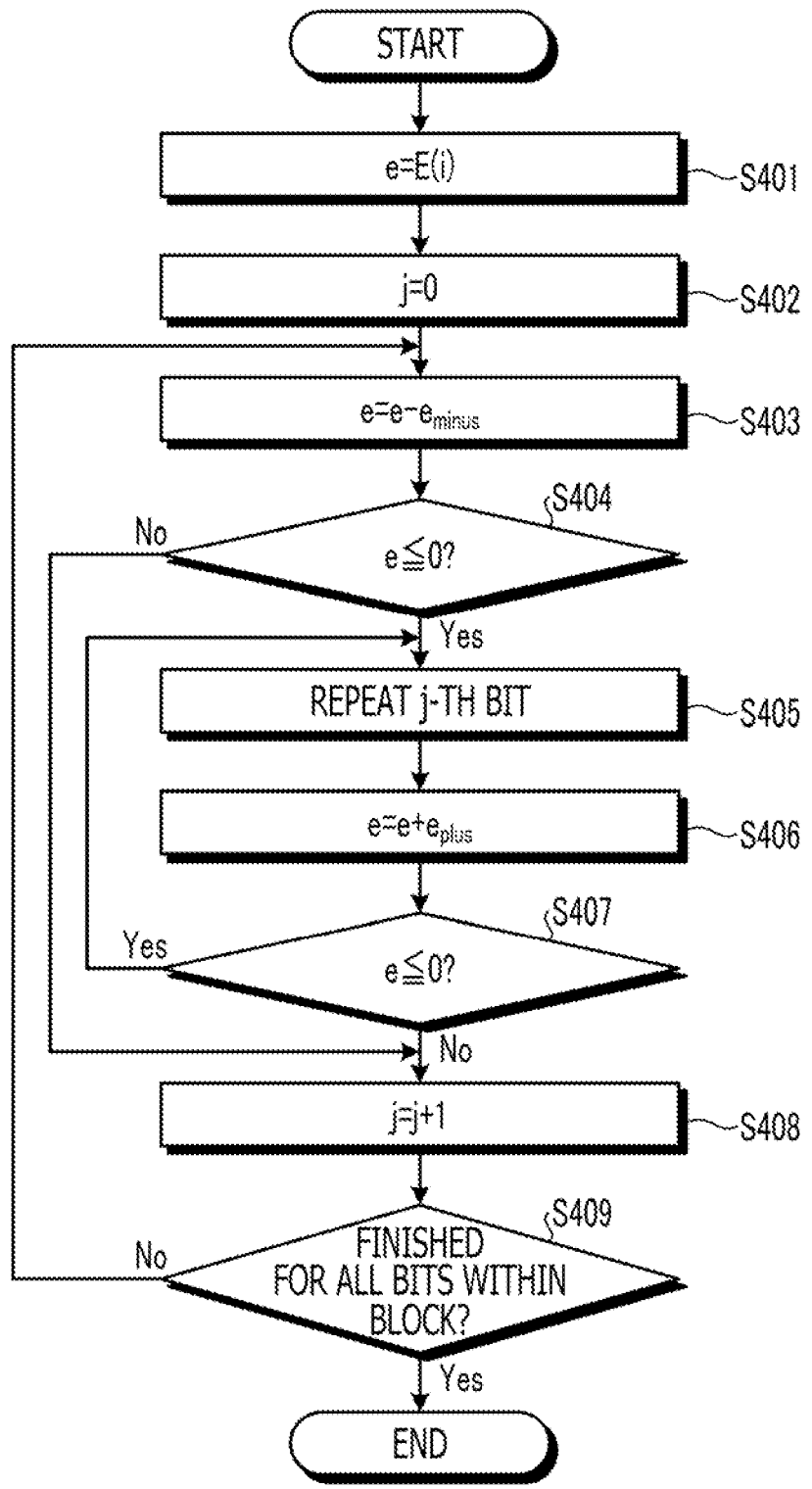
FIG. 10 is a flowchart illustrating an exemplary repetition process.

FIG. 10 is a flowchart illustrating an exemplary repetition process. As illustrated in FIG. 10, when the leading judgment value E(i) calculated by the leading parameter calculating section 122 is inputted to the bit processing section 124-i, the initial value of the judgment value e is set to the leading judgment value E(i) (step S401). Also, the index j is set to 0 (step S402), and the decrement value $e_{minus}$ is subtracted from the judgment value e (step S403). Then, it is judged whether or not the judgment value e after the subtraction is smaller than or equal to 0 (step S404). If the judgment value e is smaller than or equal to 0 (Yes in step S404), the j-th (the zeroth in this example) bit is repeated (step S405). Also, the judgment value e is updated by addition of the increment value $e_{plus}$ (step S406), and it is judged whether or not the judgment value e after the addition is smaller than or equal to 0 (step S407). If the judgment value e is still smaller than or equal to than 0 (Yes in step S407), the j-th (the zeroth in this example) bit is repeated again (step S405).

Thereafter, until the judgment value e becomes positive, repetition of the j-th (the zeroth in this example) bit and addition of the increment value $e_{plus}$ are repeated (steps S405 to S407). Then, when the judgment value e becomes positive (No in step S407), repetition of the j-th bit is finished, and the index j is incremented by 1 (step S408). On the other hand, if the judgment value e after the subtraction of the decrement value $e_{minus}$ is i larger than 0 (No in step S404), the index j is incremented by 1 without repeating the j-th (the zeroth in this example) bit (step S408).

Upon incrementing the index j by 1, it is judged whether or not a bit corresponding to the index j exists within the block. In other words, it is judged whether or not the judgment of whether or not repetition is to be performed has been finished for all of bits within the block (step S409). If it is judged as a result that there still exists a bit for which the judgment of whether or not repetition is to be performed has not been finished (No in step S409), the decrement value $e_{minus}$ is subtracted again from the current judgment value e, and it is judged whether or not the j-th bit is to be repeated (steps S403 to S407).

FIG. 11 illustrates an example of the case in which the above-mentioned repetition process is executed with respect to four blocks #0 to #3 outputted from the block dividing section 123. In the example illustrated in FIG. 11, it is assumed that the number of bits L of encoded data is 30, the number of bits B of each block is 8, the initial value $e_{ini}$ is 1, the increment value $e_{plus}$ is 7, and the decrement value $e_{minus}$ is 12. In FIG. 11, directing attention to, for example, the block #0, for the input bit index j=0, the judgment value e is −11(<0) since the judgment value e has been updated by subtracting the decrement value $e_{minus}$ from the leading judgment value E(0)=$e_{ini}$. Therefore, the zeroth input bit is repeated, and becomes as both the zeroth output bit and the first output bit.

Then, when the judgment value e is updated by addition of the increment value $e_{plus}$, the judgment value e becomes −4(<0). Therefore, the zeroth input bit is further repeated, and becomes the second output bit. Subsequently, when the judgment value e is updated by addition of the increment value $e_{plus}$, the judgment value e becomes 3(>0). Therefore, repetition of the zeroth input bit ends, and the first input bit becomes the third output bit. At this time, the decrement value $e_{minus}$ is subtracted from the judgment value e, updating the judgment value e to −9(<0). Therefore, the first input bit is repeated, and also becomes the fourth output bit. Thereafter, the same processing is repeated, and the corresponding bits of the respective blocks #0 to #3 are repeated.

In this way, whether or not each individual input bit within the blocks #0 to #3 is to be repeated may be sequentially judged based on the leading judgment values E(0) to E(3) of the blocks #0 to #3. Since whether or not repetition is to be performed may be judged independently with respect to each block, the bit processing sections 124-0 to 124-3 execute repetition processes with respect to the respective blocks in parallel. As a result, rate adjustment may be made faster.

An exemplary algorithm for the above puncturing process and repetition process is illustrated in FIG. 12. In the algorithm illustrated in FIG. 12, the index i of a block and the index j of an input bit within the block are used, and a puncturing process or a repetition process with respect to the entire encoded data is executed.

As described above, according to this embodiment, the rate adjustment apparatus divides input data into a plurality of blocks, sequentially calculate a leading judgment value with respect to the leading bit of each individual block by using recurrence equations, and executes bit processing for each individual block based on the obtained leading judgment value to thereby perform rate adjustment. Therefore, the rate adjustment apparatus does not need to perform complex computations including multiplication and modulo operation, enabling a reduction in the amount of processing. In addition, the rate adjustment apparatus may execute bit processing in parallel with respect to individual blocks. As a result, rate adjustment may be made faster while minimizing an increase in the amount of processing and circuit area.

Embodiment 2

The characteristic feature of Embodiment 2 resides in that the rate adjustment apparatus previously determines patterns each indicating the correspondence between input and output bits with respect to individual blocks obtained by dividing input data, and the bit sequence of the input data is outputted in accordance with the determined patterns.

Since the configuration of a communication system according to this embodiment is the same as that in Embodiment 1 (FIG. 1), description thereof is omitted. This embodiment differs from Embodiment 1 in the configuration of the rate matching section 120 in the transmitter 100, and the configuration of the rate de-matching section 240 in the receiver 200.

Figure 13:
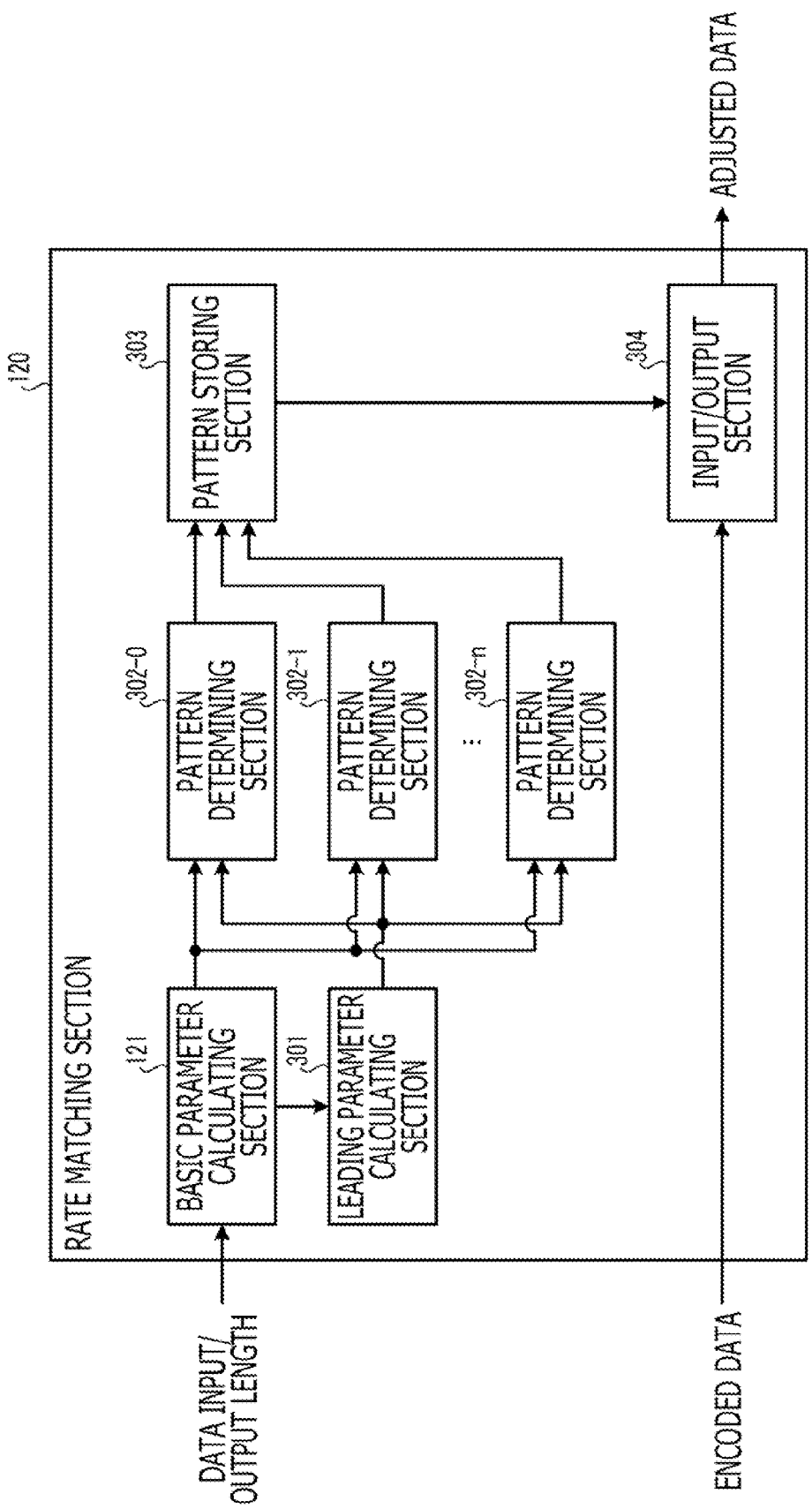
FIG. 13 is a block diagram illustrating an exemplary configuration of a rate matching section according to Embodiment 2.

FIG. 13 is a block diagram illustrating an exemplary configuration of the rate matching section 120 according to this embodiment. In FIG. 13, portions that may be the same as those in FIG. 2 are denoted by the same symbols, and description thereof is omitted. The rate matching section 120 illustrated in FIG. 13 has the basic parameter calculating section 121, a leading parameter calculating section 301, pattern determining sections 302-0 to 302-n (n is an integer larger than or equal to 1), a pattern storing section 303, and an input/output section 304.

The leading parameter calculating section 301 obtains the ordinal position in which the leading bit of each individual block is outputted, when encoded data of L bits is divided into blocks of B bits. That is, the leading parameter calculating section 301 calculates an output bit index (hereinafter, referred to as "leading index") indicating the serial number of the leading bit of each individual block.

At this time, by using a ceil function, the leading parameter calculating section 301 calculates the total number q(i) of punctured or repeated bits up to the block immediately preceding the i-th (0≦i≦floor(L/B)) block by Equation (9) below.

$$q(i) = \left\lceil \frac{B \cdot i \cdot e_{minus} - e_{ini} + 1}{e_{plus}} \right\rceil \tag{9}$$

Since the leading parameter calculating section 301 may not perform the computation according to Equation (9) with respect to all input bits, but may perform the computation once with respect to each block, an increase in the amount of processing may be reduced or minimized. Then, the leading parameter calculating section 301 calculates the leading index g(i) of the i-th block by Equation (10) or Equation (11) below.

$$g(i) = B \cdot i - q(i) \tag{10}$$

$$g(i) = B \cdot i + q(i) \tag{11}$$

It should be noted, however, that Equation (10) is an equation for obtaining the leading index in the case when puncturing is performed, and Equation (11) is an equation for obtaining the leading index in the case when repetition is performed. Further, like the leading parameter calculating section 122 according to Embodiment 1, the leading parameter calculating section 301 calculates the leading judgment value E(i) by using the recurrence equations (3) and (4). Then, the leading parameter calculating section 301 outputs the calculated leading index g(i) and the leading judgment value E(i) to a pattern determining section 302-i (0≦i≦n).

It should be noted that in this embodiment, the actual encoded data is not divided into a plurality of blocks, but such a plurality of blocks are assumed for the sake of convenience as processing units for making the pattern determination process faster.

The pattern determining sections 302-0 to 302-n determine patterns each indicating the output order of input bits in each block by using basic parameters, the leading index g(i), and the leading judgment value E(i). That is, the pattern determining sections 302-0 to 302-n judge whether puncturing or repetition is to be performed with respect to bits in each block, and determine the correspondence between an input index j and an output bit index k within the block. Then, the pattern determining sections 302-0 to 302-n output the corresponding input bit index j and output bit index k to the pattern storing section 303.

The pattern storing section 303 stores the patterns determined by the pattern determining sections 302-0 to 302-n. That is, the pattern storing section 303 stores the indexes of input and output bits to and from the rate matching section 120 in association with each other. This means that the pattern storing section 303 stores patterns each indicating the ordinal positions in which individual bits of encoded data inputted to the rate matching section 120 are outputted from the rate matching section 120. In short, the pattern storing section 303 stores the correspondence between the sequences of bits before and after encoded data is punctured or repeated.

The input/output section 304 outputs the bit sequence of encoded data inputted to the rate matching section 120, in accordance with the patterns stored in the pattern storing section 303. Therefore, the input/output section 304 is to perform puncturing or repetition of encoded data in accordance with the patterns stored in the pattern storing section 303.

Figure 14:
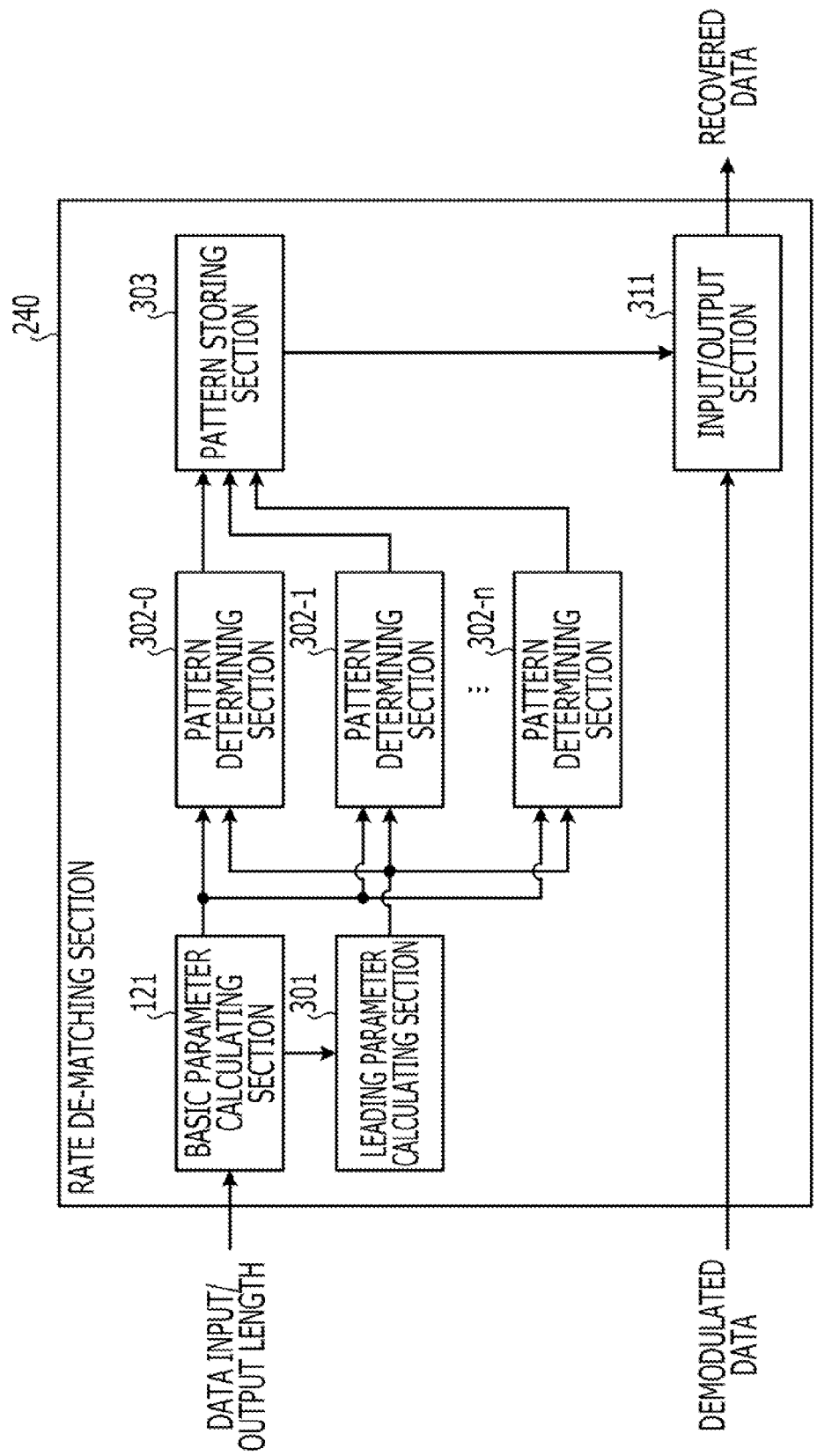
FIG. 14 is a block diagram illustrating an exemplary configuration of a rate de-matching section according to Embodiment 2.

FIG. 14 is a block diagram illustrating an exemplary configuration of the rate de-matching section 240 according to this embodiment. In FIG. 14, portions that may be the same as those in FIGS. 2 and 13 are denoted by the same symbols, and description thereof is omitted. The rate de-matching section 24 illustrated in FIG. 14 has the basic parameter calculating section 121, the leading parameter calculating section 301, the pattern determining sections 302-0 to 302-n, the pattern storing section 303, and an input/output section 311.

The input/output section 311 outputs the bit sequence of demodulated data inputted to the rate de-matching section 240, in accordance with the patterns stored by the pattern storing section 303. It should be noted, however, that the input/output section 311 performs a process reverse to the input/output section 304 of the rate matching section 120. That is, the input/output section 311 associates output bit indexes stored by the pattern storing section 303 with input bits inputted to the rate de-matching section 240, and inserts dummy bits or combine a plurality of bits, thereby outputting bits in such a way that input bit indexes are lined up in order from 0. Therefore, the input/output section 311 performs de-puncturing or de-repetition of the demodulated data in accordance with the patterns stored by the pattern storing section 303.

Figure 15:
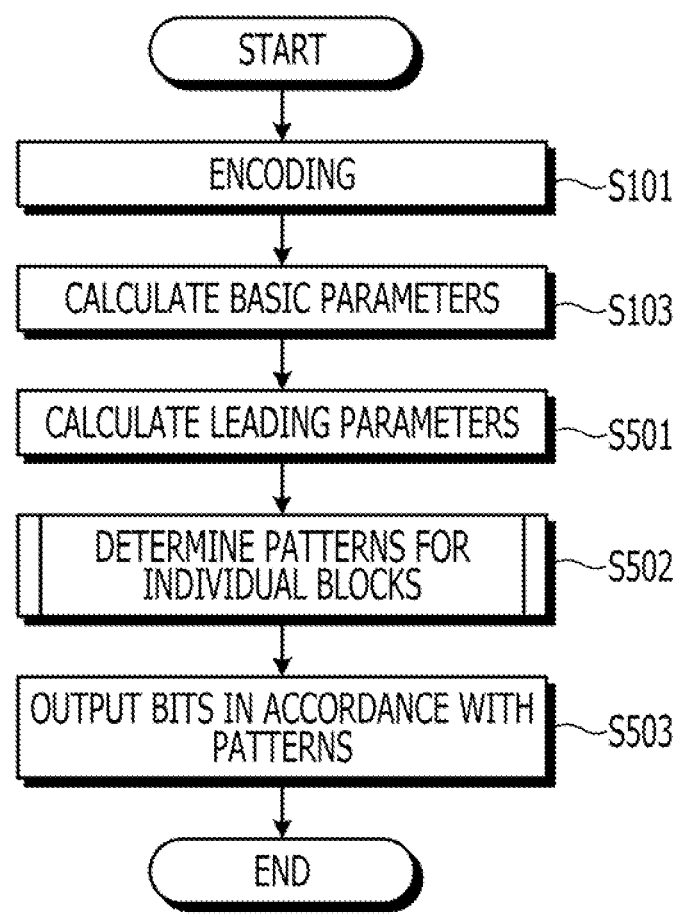
FIG. 15 is a flowchart illustrating an exemplary rate adjustment processing according to Embodiment 2.

Next, a rate adjustment process in the transmitter 100 configured as mentioned above will be described with reference to the flowchart illustrated in FIG. 15 as well as FIGS. 1 and 14. It should be noted that although de-puncturing or de-repetition is performed instead of puncturing or repetition in a rate adjustment process in the receiver 200, since the basic procedure is the same as the rate adjustment process in the transmitter 100, description thereof is omitted. In FIG. 15, portions that may be the same as those in FIG. 5 are denoted by the same symbols.

As transmission data undergoes error correction encoding by the error correction encoding section 110 (step S101), parity bits are appended to the information bits of the transmission data. At this time, for example, in the case of error correction encoding with a ⅓ coding rate, two parity bits are appended to one information bit. Then, the bit sequence of encoded data obtained by the error correction encoding is inputted to the input/output section 304 of the rate matching section 120.

On the other hand, from the input/output length of data indicating to what extent the rate of encoded data of L bits is to be adjusted, the initial value $e_{ini}$, the increment value $e_{plus}$, and the decrement value $e_{minus}$ specified by 3GPP are calculated by the basic parameter calculating section 121 as basic parameters (step S103). The calculated basic parameters are outputted to the leading parameter calculating section 301 and the pattern determining sections 302-0 to 302-n, and parameters with respect to the leading bits of individual blocks are calculated by the leading parameter calculating section 301 (step S501). That is, the leading index g(i) of each block is sequentially calculated by the leading parameter calculating section 301 by performing the computations of Equations (9) to (11) above. At the same time, the recurrence equations (3) and (4) are used to sequentially calculate α(i) and the leading judgment value E(i) of each block. The calculated leading index g(i) and the leading judgment value E(i) are outputted to each corresponding pattern determining section 302-i ($0 \leq i \leq n$).

Then, correspondence patterns between input and output bits are determined by the pattern determining sections 302-0 to 302-n through computation using the leading index g(i), the leading judgment value E(i), the increment value $e_{plus}$, and the decrement value $e_{minus}$ (step S502). The determined patterns are stored by the pattern storing section 303, and the bit sequence of encoded data inputted to the input/output section 304 is outputted in accordance with the patterns (step S503) so that adjusted data whose rate has been adjusted is outputted.

Figure 16:
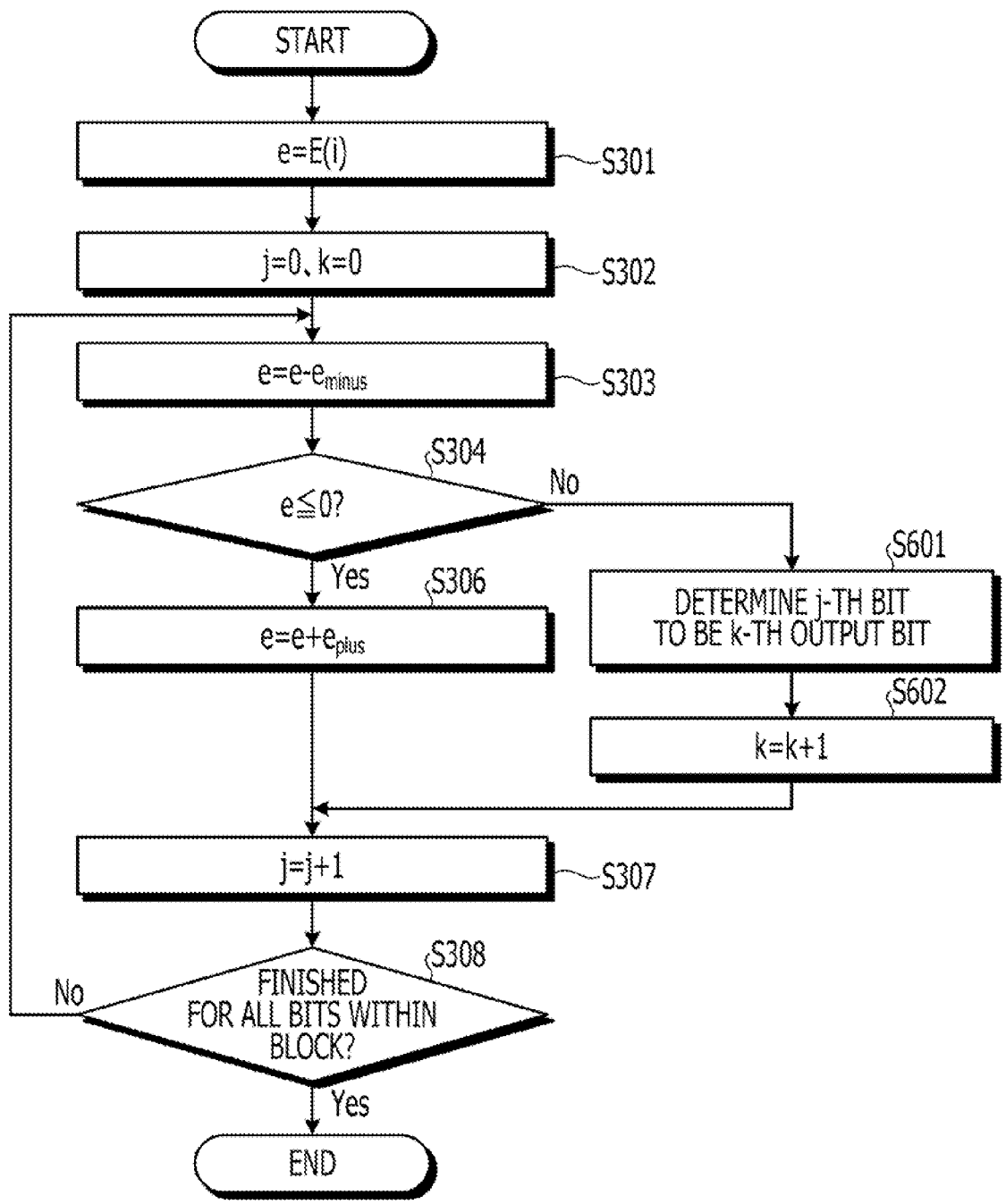
FIG. 16 is a flowchart illustrating an exemplary pattern determination process at the time of puncturing.

Next, an exemplary pattern determination process according to this embodiment will be described. FIG. 16 is a flowchart illustrating the pattern determination process at the time of puncturing. In FIG. 16, portions that may be the same as those in FIG. 8 are denoted by the same symbols.

When the leading judgment value E(i) calculated by the leading parameter calculating section 301 is inputted to the pattern determining section 302-i, the initial value of the judgment value e is set to the leading judgment value E(i) (step S301). Also, the input bit index j and the output bit index within a block are set to 0 (step S302), and the decrement value $e_{minus}$ is subtracted from the judgment value e (step S303). Then, it is judged whether or not the judgment value e after the subtraction is smaller than or equal to 0 (step S304). If the judgment value e is smaller than or equal to 0 (Yes in step S304), the judgment value e is updated by addition of the increment value $e_{plus}$ (step S306), and the index j of the input bit is incremented by 1 (step S307).

On the other hand, if the judgment value e after the subtraction of the decrement value $e_{minus}$ is larger than 0 (No in step S304), it is determined that the j-th (the zeroth in this example) input bit is to become the k-th (the zeroth in this example) output bit (step S601). That is, it is determined that the j-th (the zeroth in this example) input bit within the block is to become the k-th (the zeroth in this example) output bit within the block without being punctured. Then, the leading index g(i) of the block is used to convert the correspondence between the input bit index j and the output bit index k within the block into the correspondence between input and output bit indexes for the entire encoded data. Specifically, the input bit index of the j-th input bit within the block is (B·i+j), and the output bit index of the k-th output bit within the block is (g(i)+k). Therefore, these input and output bit indexes are outputted to the pattern storing section 303.

If the j-th input bit within the block is to become the k-th output bit within the block without being punctured, the index k of the next output bit is incremented by 1 (step S602). Then, the index j of the input bit is also incremented by 1 (step S307).

Upon incrementing the index j by 1, it is judged whether or not a bit corresponding to the index j exists within the block. In other words, it is judged whether or not the judgment of whether or not puncturing is to be performed has been finished for all of bits within the block (step S308). If it is judged as a result that there still exists a bit for which the judgment of whether or not puncturing is to be performed has not been finished (No in step S308), the decrement value $e_{minus}$ is subtracted from the current judgment value e again, and it is judged whether or not the j-th bit is to be punctured (steps S303 to S306, S601, and S602). If it is judged that a bit corresponding to the index j does not exist within the block, (Yes in step S308), the puncturing process ends.

FIG. 17 illustrates an example of the case in which the above-mentioned pattern determination process is executed with respect to four blocks #0 to #3. In the example illustrated in FIG. 17, it is assumed that the number of bits L of encoded data is 30, the number of input bits B of each block is 8, the initial value $e_{ini}$ is 1, the increment value $e_{plus}$ is 60, and the decrement value $e_{minus}$ is 12. In FIG. 17, for example, the output bit index (leading index) of the leading bit of the block #1 is 6. This is obtained by Equations (9) and (10) above as follows.

$$g(1) = 8 \cdot 1 - q(1)$$
$$= 8 \cdot 1 - \text{ceil}\{(8 \cdot 1 \cdot 12 - 1 + 1)/60\}$$
$$= 6$$

Then, since the number of input bits B of each block is 8, the leading input bit index of the block #1 becomes 8, and in accordance with judgment using the judgment value e, this input bit is not to be punctured. Also, since this input bit is the beginning (i.e. the zeroth) output bit within the block, its output bit index is g(1)+0=6, and the input bit index 8 and the output bit index 6 are associated with each other. Likewise, for each of other input bits as well, whether or not the input bit is to be punctured is judged, and if the input bit is not to be punctured, the corresponding output bit index is calculated, and a pattern indicating the correspondence between input and output bits is determined. It should be noted that as described above, whether or not an input bit is to be punctured is determined by judgment using the judgment value e as in Embodiment 1.

In this way, output bit indexes corresponding to the indexes of individual input bits in the blocks #0 to #3 may be sequentially determined based on the leading indexes g(0) to g(3) and leading judgment values E(0) to E(3) of the blocks #0 to #3. That is, since the correspondence between bits before and after puncturing may be determined independently with respect to each block, the pattern determining sections 302-0 to 302-3 individually execute pattern determination processes with respect to the respective blocks in parallel. As a result, rate adjustment may be made faster.

An exemplary algorithm for the above pattern determination process is illustrated in FIG. 18. FIG. 18 illustrates the algorithm for the pattern determination process in the case when puncturing or repetition is to be performed. In the algorithm illustrated in FIG. 18, while incrementing the index j of an input bit within a block by 1, whether or not each individual input bit is to be punctured or repeated is judged, and the correspondence between the index j and the index k of an output bit within the block is determined. Then, the index k of the output bit within the block is converted into an output bit index (g(i)+k), and the corresponding input bit index is calculated as (B*i+j).

As described above, according to this embodiment, the rate adjustment apparatus previously calculates the indexes of output bits corresponding to the leading input bits of individual blocks obtained by dividing input data into a plurality of blocks. Then, the rate adjustment apparatus sequentially calculates the leading judgment value of each individual block by using recurrence equations, and determines the correspondence between input and output bit indexes while judging whether or not puncturing or repetition is performed based on the obtained leading judgment value. Further, the rate adjustment apparatus outputs the input data in accordance with the determined correspondence to thereby perform rate adjustment. Thus, calculation of the leading index only needs to be executed once with respect to each block, and complex computations including multiplication and modulo operation need not to be performed in calculating the leading judgment value, thereby enabling a reduction in the amount of processing. In addition, the rate adjustment apparatus may determine the correspondence between bits before and after puncturing or repetition in parallel with respect to each block. As a result, rate adjustment may be made faster while reducing or minimizing an increase in the amount of processing and circuit area.

Embodiment 3

The characteristic feature of Embodiment 3 resides in that the rate adjustment apparatus performs serial/parallel conversion on input data, and judges whether or not puncturing or repetition is performed in order from the front bit.

Since the configuration of a communication system according to this embodiment may be the same as that in Embodiment 1 (FIG. 1), description thereof is omitted. This embodiment differs from Embodiment 1 in the configuration of the rate matching section 120 in the transmitter 100, and in the configuration of the rate de-matching section 240 in the receiver 200.

Figure 19:
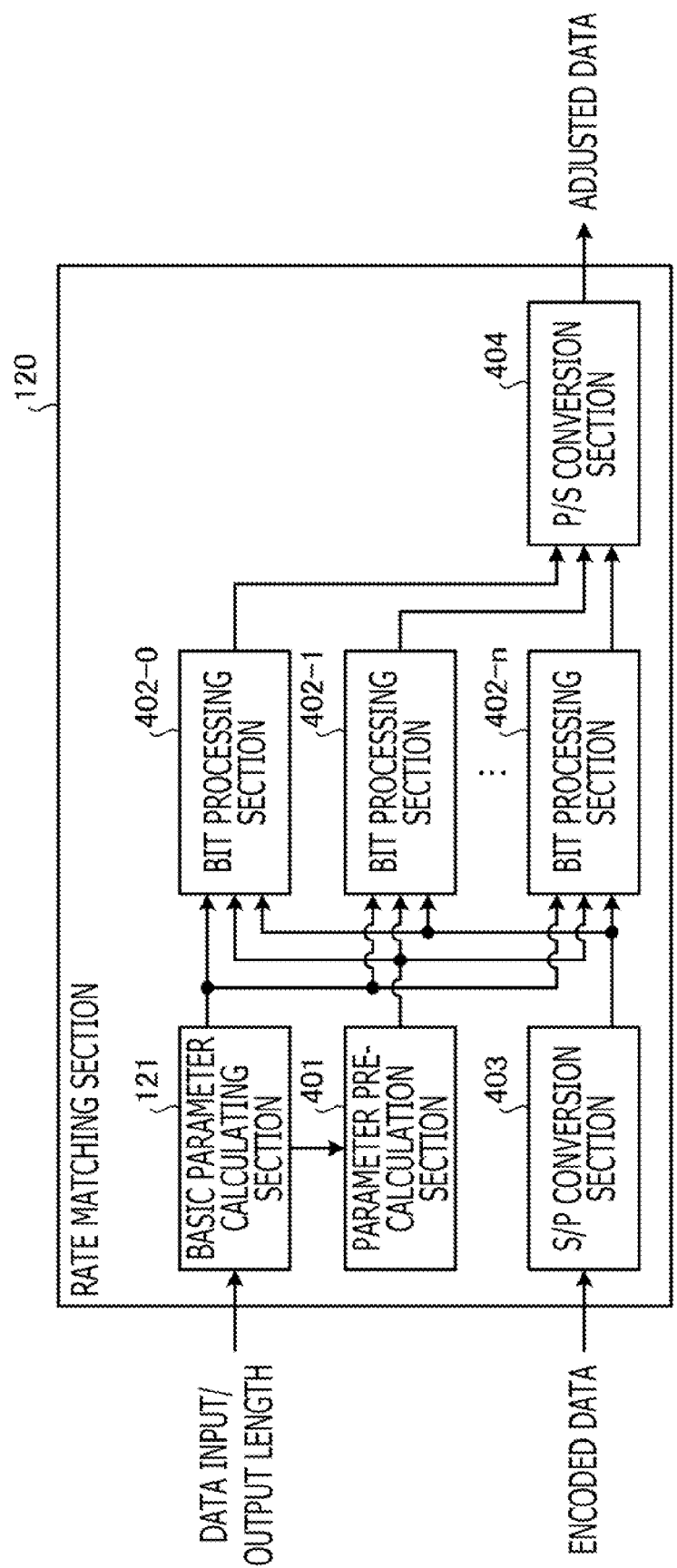
FIG. 19 is a block diagram illustrating an exemplary configuration of a rate matching section according to Embodiment 3.

FIG. 19 is a block diagram illustrating an exemplary configuration of the rate matching section 120 according to this embodiment. In FIG. 19, portions that may be the same as those in FIG. 2 are denoted by the same symbols, and description thereof is omitted. The rate matching section 120 illustrated in FIG. 19 has the basic parameter calculating section 121, a parameter pre-calculation section 401, bit processing sections 402-0 to 402-n (n is an integer larger than or equal to 1), a serial/parallel conversion (hereinafter referred to as "S/P conversion") section 403, and a parallel/serial conversion (hereinafter referred to as "P/conversion") section 404.

The parameter pre-calculation section 401 calculates parameters with respect to the leading bits of a plurality of blocks obtained by dividing encoded data, and parameters for individual bits in each one block. That is, the parameter pre-calculation section 401 calculates the same number of parameters as the number of blocks and the same number of parameters as the number of bits forming the blocks. Specifically, the parameter pre-calculation section 401 calculates the following parameters α(i) and β(j) obtained by transformation of Equation (7) above with respect to every i and every j. It should be noted that as in Embodiment 1, the index of each block when encoded data is divided into a plurality of blocks is i, and the index of each bit within the block is j.

$$\alpha(i)=(E_{minus} \cdot i) \bmod e_{plus} \quad (12)$$

$$\beta(j)=(e_{minus} \cdot j) \bmod e_{plus} \quad (13)$$

Now, the parameters according to Equations (12) and (13) above will be described. When Equation (7) is rearranged with respect to the indexes i and j, Equation (7) may be transformed as $$e(m) = e(B \cdot i + j)$$
$$= e_{ini} - [\{e_{minus} \cdot B \cdot i + e_{minus} \cdot j\} \bmod e_{plus}]$$
$$= e_{ini} - [\{(E_{minus} \cdot i) \bmod e_{plus} + (e_{minus} \cdot j) \bmod e_{plus}\} \bmod e_{plus}].$$

The term with respect to the index i of this equation is the parameter α(i) indicated in Equation (12), and the term with respect to the index j is the parameter β(j) indicated in Equation (13). That is, in this embodiment, the judgment value e with respect to the j-th bit of the arbitrary i-th block is obtained by Equation (14) below.

$$e=e_{ini}-\{\alpha(i)+\beta(j)\} \bmod e_{plus} \quad (14)$$

Incidentally, as described above with reference to Embodiment 1, the parameter α(i) indicated in Equation (12) may be expressed by the recurrence equation (4). Likewise, the parameter β(j) indicated in Equation (13) may be expressed by the recurrence equation (15) below.

$$\beta(j)=[\beta(j-1)+e_{minus}] \bmod e_{plus} \quad (15)$$

Accordingly, like the leading parameter calculating section 122 according to Embodiment 1, by using the recurrence equations (4) and (15), the parameter pre-calculation section 401 calculates the parameters α(i) and β(j) by comparative magnitude judgment and subtraction. Thus, the parameter pre-calculation section 401 may calculate the parameter α(i) with respect to the leading bit of each individual block, and the parameter β(j) with respect to each bit within the block with a small amount of processing.

The bit processing sections 402-0 to 402-n perform puncturing or repetition processes with respect to bits outputted from the S/P conversion section 403 to thereby adjust the rate. At this time, the bit processing sections 402-0 to 402-n determine the bits to be punctured or repeated, by using the increment value $e_{plus}$ and the decrement value $e_{minus}$ calculated by the basic parameter calculating section 121, and the parameters α(i) and β(j) calculated by the parameter pre-calculation section 401.

That is, the bit processing sections 402-0 to 402-n each calculate the judgment value e corresponding to the bit immediately preceding a target bit by using Equation (14), and subtract the decrement value $e_{minus}$ from the calculated judgment value e to thereby find the judgment value e corresponding to the target bit. Then, if the judgment value e becomes negative, the bit processing sections 402-0 to 402-n each puncture or repeat the target bit.

The S/P conversion section 403 converts encoded data inputted as serial data into parallel data by S/P conversion, and outputs individual bits to the bit processing sections 402-0 to 402-n. Accordingly, the S/P conversion section 403 outputs consecutively arranged bits to the bit processing sections 402-0 to 402-n in parallel, such as by outputting the zeroth bit of the encoded data to the bit processing section 402-0 and outputting the first bit to the bit processing section 402-1. In other words, with every (n+1) bits of the encoded data as a processing unit, the S/P conversion section 403 outputs bits in each processing unit to the corresponding bit processing sections 402-0 to 402-n.

The P/S conversion section 404 converts the bits outputted in parallel from the bit processing sections 402-0 to 402-n into serial data by P/S conversion, and outputs the result as adjusted data whose rate has been adjusted. That is, the P/S conversion section 404 combines the processing units punctured or repeated by the respective bit processing sections 402-0 to 402-n, and outputs the result as adjusted data.

Figure 20:
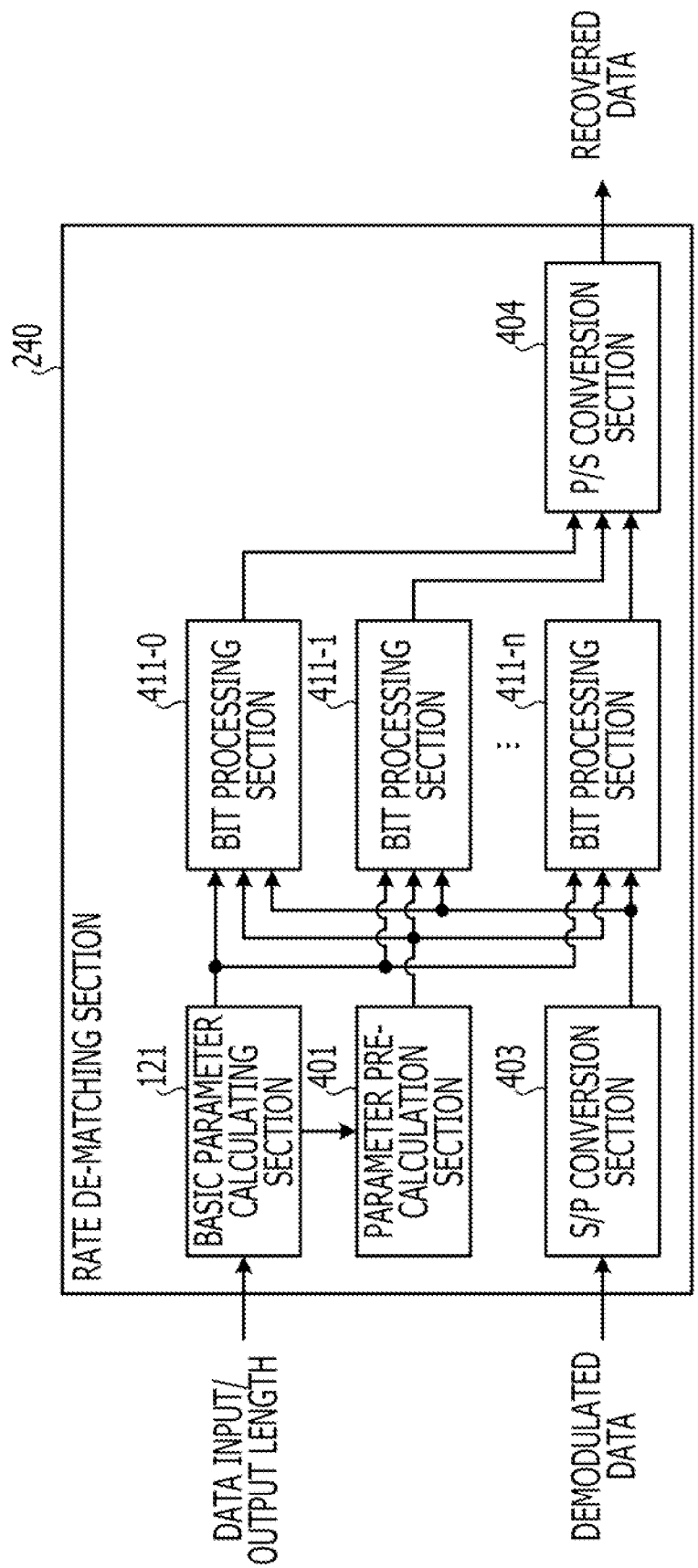
FIG. 20 is a block diagram illustrating an exemplary configuration of a rate de-matching section according to Embodiment 3.

FIG. 20 is a block diagram illustrating an exemplary configuration of the rate de-matching section 240 according to this embodiment. In FIG. 20, portions that may be the same as those in FIGS. 2 and 19 are denoted by the same symbols, and description thereof is omitted. The rate de-matching section 240 illustrated in FIG. 20 has the basic parameter calculating section 121, the parameter pre-calculation section 401, bit processing sections 411-0 to 411-n, the S/P conversion section 403, and the P/S conversion section 404.

The bit processing sections 411-0 to 411-n each perform de-puncturing or de-repetition that is the reverse of puncturing or repetition on the bits in each processing unit, and recover the rate before the puncturing or repetition at the transmitter 100. At this time, the bit processing sections 411-0 to 411-n determine the bits to be de-punctured or de-repeated, by using the increment value $e_{plus}$ and the decrement value $e_{minus}$ calculated by the basic parameter calculating section 121, and the parameters α(i) and β(j) calculated by the parameter pre-calculation section 401.

That is, the bit processing sections 411-0 to 411-n each calculate the judgment value e corresponding to the bit immediately preceding a target bit by using Equation (14), and subtract the decrement value $e_{minus}$ from the calculated judgment value e to thereby find the judgment value e corresponding to the target bit. Then, if the judgment value e becomes negative, the bit processing sections 411-0 to 411-n perform de-puncturing or de-repetition by inserting dummy bits or combining a plurality of bits.

In this embodiment, the parameter pre-calculation section 401 previously calculates the parameter α(i) with respect to the leading bit of each individual block, and the parameter β(j) with respect to each individual bit in each one block. At this time, as described above with reference to Embodiment 1, the modulo operation on the right side of each of the recurrence equations (4) and (15) may be substituted for by comparative magnitude judgment and subtraction. Specifically, for example, a calculation algorithm for the parameter β(j) is illustrated in FIG. 21. Although complex computations such as modulo operation or subtraction are not performed in the algorithm illustrated in FIG. 21, the parameter β(j) is sequentially calculated with respect to every index j.

In this way, since complex computations including modulo operation and multiplication may not be performed in calculating the parameters α(i) and β(j), the amount of processing at the time of rate adjustment may be reduced. In addition, since the parameters α(i) and β(j) may be calculated with respect to every index i and every index j, it is possible to calculate the judgment value e with respect to an arbitrary bit from Equation (14). Therefore, instead of sequentially judging whether or not puncturing or repetition is performed with respect to individual bits within a block, whether or not puncturing or repetition is performed may be judged independently with respect to an arbitrary bit. Therefore, in this embodiment, whether or not puncturing or repetition is performed may be judged in parallel with respect to the consecutive bits of encoded data, and bit processing may be performed in order from the front bit of the encoded data. As a result, a further reduction in the processing delay of rate matching and rate de-matching may be achieved.

FIG. 22 is a diagram illustrating an exemplary algorithm for the bit processing according to this embodiment. In the algorithm illustrated in FIG. 22, {α(i)+β(j)} on the right side of Equation (14) is represented by a variable tmp. Now, from Equations (12) and (13), α(i) and β(j) are each the remainder when a given value is divided by the increment value $e_{plus}$, and hence smaller than the increment value $e_{plus}$. From this, it is appreciated that the variable tmp does not exceed twice of the increment value $e_{plus}$ at maximum. Then, since {α(i)+β(j)} mod $e_{plus}$ on the right side of Equation (14) is the remainder when the variable tmp not exceeding twice of the increment value $e_{plus}$ is divided by the increment value $e_{plus}$, if the variable tmp is smaller than or equal to the increment value $e_{plus}$, Equation (14) becomes as follows.

$$e=e_{ini}-tmp$$

If the variable tmp is larger than the increment value $e_{plus}$, Equation (14) becomes as follows.

$$e=e_{ini}-(tmp-e_{plus})$$

The algorithm illustrated in FIG. 22 calculates the judgment value e in this way, and does not perform complex computations including modulo operation and multiplication. In other words, the modulo operation is omitted by performing comparative magnitude judgment and subtraction by using the parameters $\alpha(i)$ and $\beta(j)$ previously calculated with respect to every index i and every index j. As a result, the judgment value e may be calculated with a small amount of processing to judge whether or not puncturing or repetition is performed with respect to each individual bit.

As described above, according to this embodiment, the rate adjustment apparatus previously calculates parameters for individual blocks obtained by dividing input data into a plurality of blocks and for individual bits forming each of the blocks by using recurrence equations. Then, the rate adjustment apparatus performs rate adjustment by executing bit processing in parallel in order from the front bit of the input data based on the parameters. Thus, the rate adjustment apparatus may not perform complex computations including multiplication and modulo operation in calculating the parameters, thereby enabling a reduction in the amount of processing. In addition, since there is no sequential block-by-block processing, there is no processing delay, thereby further making rate adjustment faster.

Embodiment 4

According to Embodiment 4, the rate adjustment apparatus determines patterns each indicating the correspondence between input and output bits in order from the front bit of input data, and outputs the bit sequence of the input data in accordance with the determined patterns.

Since the configuration of a communication system according to this embodiment may be the same as that in Embodiment 1 (FIG. 1), description thereof is omitted. This embodiment differs from Embodiment 1 in the configuration of the rate matching section 120 in the transmitter 100, and in the configuration of the rate de-matching section 240 in the receiver 200.

Figure 23:
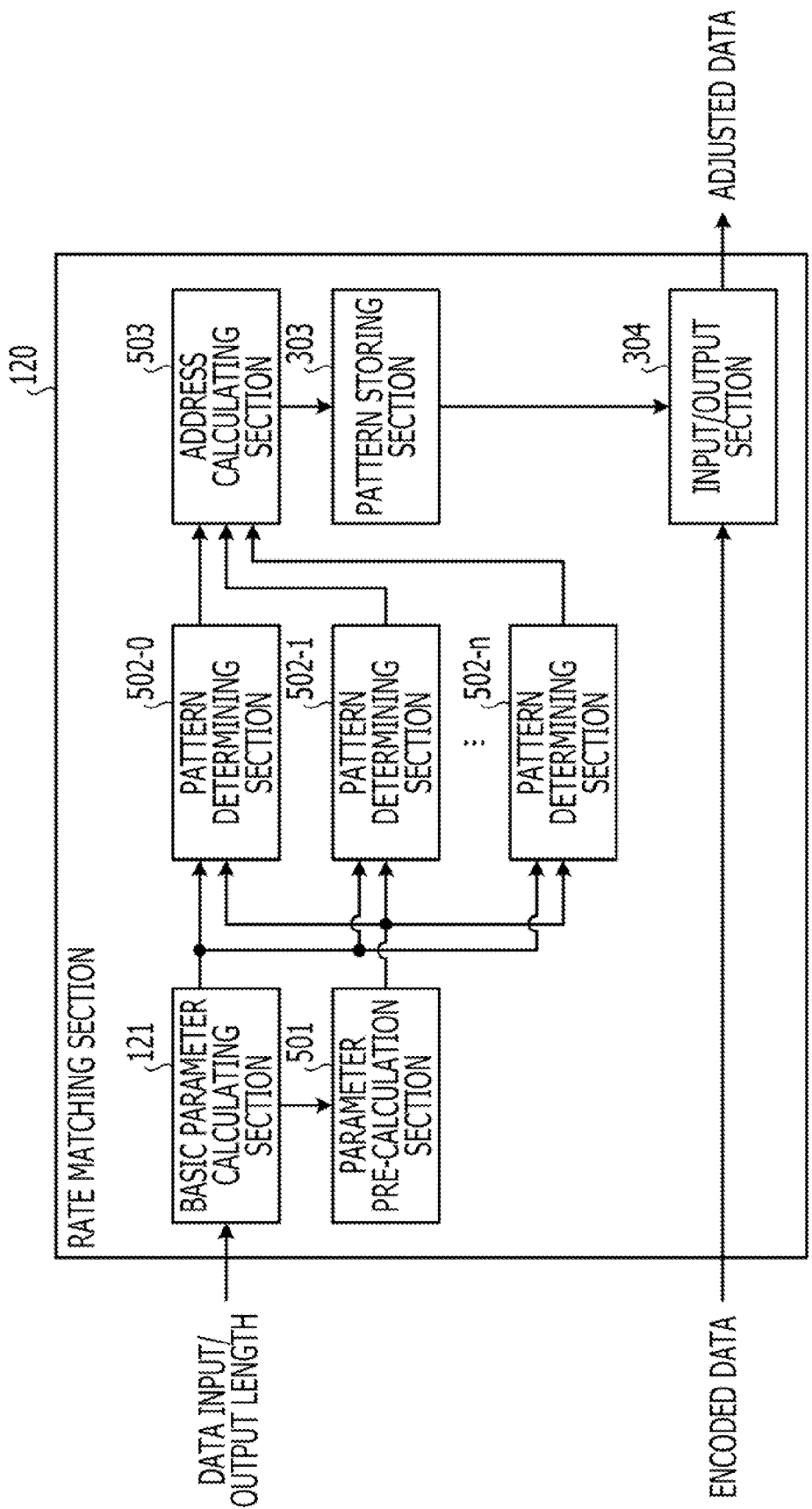
FIG. 23 is a block diagram illustrating an exemplary configuration of a rate matching section according to Embodiment 4.

FIG. 23 is a block diagram illustrating the configuration of the rate matching section 120 according to this embodiment. In FIG. 23, portions that may be the same as those in FIGS. 2 and 13 are denoted by the same symbols, and description thereof is omitted. The rate matching section 120 illustrated in FIG. 23 has the basic parameter calculating section 121, a parameter pre-calculation section 501, pattern determining sections 502 to 502-n (n is an integer larger than or equal to 1), an address calculating section 503, the pattern storing section 303, and the input/output section 304.

The parameter pre-calculation section 501 calculates parameters with respect to the leading bits of a plurality of blocks obtained by dividing encoded data, and parameters for individual bits in each one block. That is, the parameter pre-calculation section 501 may calculate the same number of parameters as the number of blocks and the same number of parameters as the number of bits forming the blocks. Specifically, the parameter pre-calculation section 501 calculates the parameters $\alpha(i)$ and $\beta(j)$ indicated in Equations (12) and (13) above with respect to every i and every j. At this time, by using the recurrence equations (4) and (15) as in Embodiment 3, the parameter pre-calculation section 501 calculates the parameters $\alpha(i)$ and $\beta(j)$ by comparative magnitude judgment and subtraction.

The pattern determining sections 502-0 to 502-n judge whether or not puncturing or repetition is performed with respect to the consecutive bits of the encoded data in parallel by using the basic parameters and the parameters $\alpha(i)$ and $\beta(j)$. At this time, the pattern determining sections 502-0 to 502-n use the algorithm according to Embodiment 3 illustrated in FIG. 22 to judge whether or not puncturing or repetition is performed in order from the front bit.

Then, when in the puncturing mode, the pattern determining sections 502-0 to 502-n each output "0" upon judging that an input bit is to be punctured, and output "1" upon judging that an input bit is not to be punctured. Also, when in the repetition mode, the pattern determining sections 502-0 to 502-n each output a value equal to the number of times of repetition plus 1 upon judging that an input bit is to be repeated, and output "1" upon judging that an input bit is not to be repeated. At this time, the pattern determining sections 502-0 to 502-n may calculate the number of times repetition is performed by using the algorithm according to Embodiment 2 illustrated in FIG. 18.

The address calculating section 503 calculates the output bit index assigned to the next bit to be processed in parallel by each of the pattern determining sections 502-0 to 502-n, based on a value outputted from each of the pattern determining sections 502-0 to 502-n. In this embodiment, whether or not puncturing or repetition is performed is judged in parallel with respect to all of bits within one block by each of the pattern determining sections 502-0 to 502-n. Accordingly, the address calculating section 503 calculates the start number (hereinafter referred to as "start index") of an output bit index corresponding to the next block for which whether or not puncturing or repetition is performed is judged. Specifically, the address calculating section 503 adds the value outputted from each of the pattern determining sections 502-0 to 502-n to the previous calculated start index to thereby calculate a new start index.

Also, the address calculating section 503 acquires the correspondence between input and output bits within the block based on the value outputted from each of the pattern determining sections 502-0 to 502-n, and determines a pattern indicating input and output bit indexes from the acquired correspondence and the start index.

Figure 24:
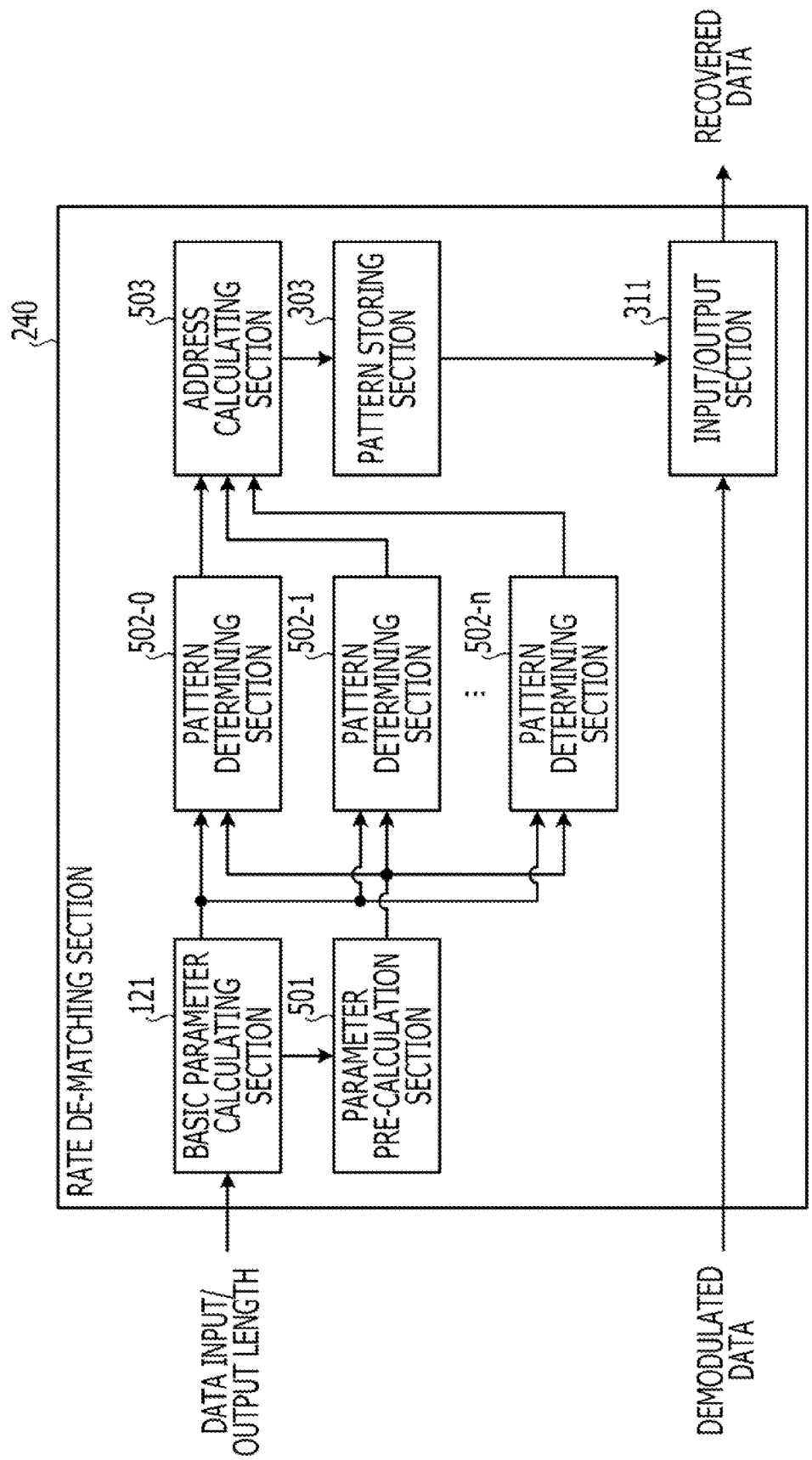
FIG. 24 is a block diagram illustrating an exemplary configuration of a rate de-matching section according to Embodiment 4.

FIG. 24 is a block diagram illustrating the configuration of the rate de-matching section 240 according to this embodiment. Since the rate de-matching section 240 illustrated in FIG. 24 may be configured by the same processing sections as those in FIGS. 2, 13, and 14, description thereof is omitted.

Figure 25:
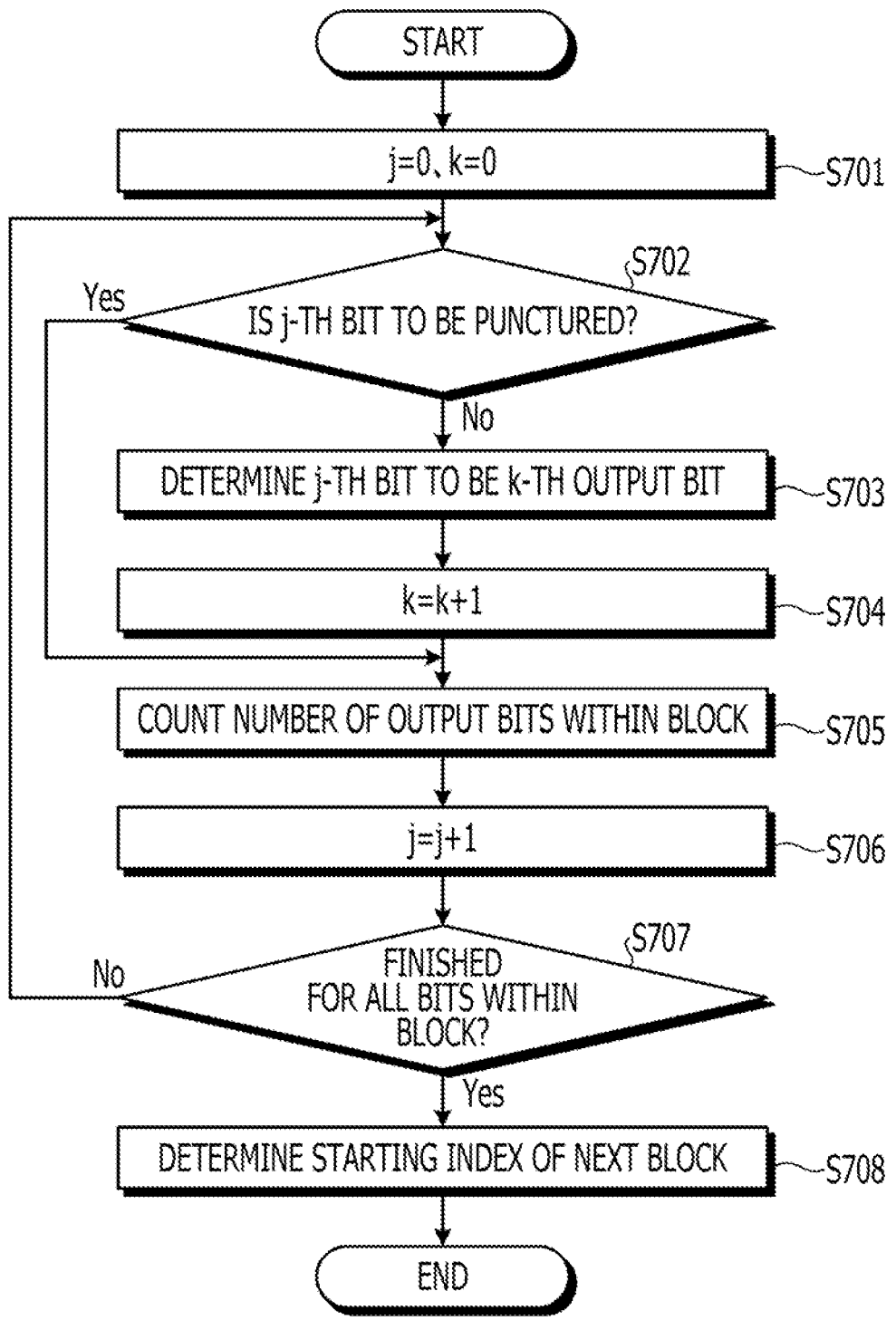
FIG. 25 is a flowchart illustrating an exemplary address calculation process at the time of puncturing.

Next, an address calculation process according to this embodiment will be described. FIG. 25 is a flowchart illustrating an exemplary address calculation process at the time of puncturing. In the following description, the index of each input bit within a block is denoted by j, and the index of each output bit is denoted by k. Also, the following process is executed by the pattern determining sections 502-0 to 502-n and the address calculating section 503 illustrated in FIG. 24.

First, the input index j and the output bit index within the block being currently processed in parallel by each of the pattern determining sections 502-0 to 502-n are set to 0 (step S701). Then, it is judged by the pattern determining section 502-0 whether or not the j-th (the zeroth in this example) input bit is to be punctured, based on judgment using the judgment value e (step S702). If it is judged as a result that the j-th (the zeroth in this example) input bit is not to be punctured (No in step S702), this input bit is determined to be the k-th (the zeroth in this example) output bit (step S703). At this time, "1" is outputted from the pattern determining section 502-0 to the address calculating section 503, and the index k of the output bit is incremented by 1 (step S704). On the other hand, if the j-th (the zeroth in this example) input bit is to be punctured (Yes in step S702), "0" is outputted from the pattern determining section 502-0 to the address calculating section 503, and the index k of the output bit is not incremented.

In the address calculating section 503, a value outputted from the pattern determining section 502-0 is added to the previously calculated start index, thereby counting the number of output bits within the block (step S705). That is, if a bit for which whether or not puncturing is to be performed has been judged by the pattern determining section 502-0 is punctured, the number of output bits is counted as 0, and if the bit is not punctured, the number of output bits is counted as 1.

Then, the index j of the input bit is incremented by 1 (step S706), and it is judged whether or not "1" or "0" has been outputted from all of the pattern determining sections 502-0 to 502-$n$. That is, it is judged whether or not "1" or "0" has been inputted with respect to all of bits within the block being currently processed in parallel (step S707). If it is judged as a result that there are pattern determining sections 502-0 to 502-$n$ that have not yet outputted "0" or "1" (No in step S707), the same judgment as that performed by the pattern determining section 502-0 is also performed by the pattern determining sections 502-1 to 502-$n$ (steps S702 to S706), so that "1" or "0" is outputted to the address calculating section 503.

It should be noted that in FIG. 25, for the convenience of description, "1" or "0" is outputted in order from the pattern determining sections 502-0 to 502-$n$ as the index j is incremented. However, the judgments by the pattern determining sections 502-0 to 502-$n$ are executed in parallel. Therefore, "1" or "0" may be outputted substantially simultaneously from the pattern determining sections 502-0 to 502-$n$.

Once "1" or "0" is outputted from all of the pattern determining sections 502-0 to 502-$n$ to the address calculating section 503, the counting result by the address calculating section 503 is added to the previously calculated start index. That is, the number of bits to be outputted from the block being processed in parallel by each of the pattern determining sections 502-0 to 502-$n$ is added to the previously calculated start index, and the start index of the next block is thus determined (step S708).

In this way, based on "1" or "0" outputted from each of the pattern determining sections 502-0 to 502-$n$ depending on whether or not puncturing is to be performed, the start number of the output bit index of the next block to be processed in parallel by each of the pattern determining sections 502-0 to 502-$n$ is determined. It should be noted that since the value of "1" or "0" outputted from each of the pattern determining sections 502-0 to 502-$n$ indicates whether or not each individual input bit is to be punctured, the address calculating section 503 may easily acquire the correspondence between input and output bits. Accordingly, the address calculating section 503 determines a pattern indicating the correspondence between input and output bit indexes from the start index and the correspondence between input and output bits, and stores the pattern in the pattern storing section 303.

FIG. 26 is a diagram illustrating an exemplary algorithm for the address calculation process according to this embodiment. In the algorithm illustrated in FIG. 26, a value outputted from each of the pattern determining sections 502-0 to 502-$n$ is pattern(j), the increment sum_blk of the output bit index within a block is calculated based on this value, and finally the start index sum of the next block is calculated.

As described above, according to this embodiment, the rate adjustment apparatus previously calculates parameters for individual blocks obtained by dividing input data into a plurality of blocks and for individual bits forming each block by using recurrence equations. Then, the rate adjustment apparatus determines the correspondence between input and output bit indexes, while judging whether or not puncturing or repetition is performed in order from the front bit of the input data based on the parameters. Further, the rate adjustment apparatus adjusts the rate by outputting the input data in accordance with the determined correspondence. Thus, the rate adjustment apparatus does not need to perform complex computations including multiplication and modulo operation in calculating the parameters, thereby enabling a reduction in the amount of processing. In addition, since there is no sequential block-by-block processing, there is no processing delay, thereby further making rate adjustment faster.

Embodiment 5

In Embodiments 1 to 4 mentioned above, the decrement value $e_{minus}$ is subtracted from the judgment value e with respect to the bit immediately preceding a target bit, and whether or not puncturing or repetition is performed is judged based on whether or not the resulting judgment value e becomes negative. However, it is also possible to directly judge whether or not puncturing or repetition is performed with respect to a target bit. According to Embodiment 5, the rate adjustment apparatus directly judges whether or not puncturing or repetition is performed with respect to a target bit.

Since the configuration of a communication system according to this embodiment may be the same as that in Embodiment 1 (FIG. 1), description thereof is omitted. Also, in this embodiment, the configurations of the rate matching section 120 and the rate de-matching section 240 may also be the same as those in Embodiments 1 to 4. It should be noted, however, that this embodiment differs from Embodiments 1 to 4 in the algorithm used for the judgment of whether or not puncturing or repetition is performed in the bit processing sections 124-0 to 124-$n$, 241-0 to 241-$n$, 402-0 to 402-$n$, 411-0 to 411-$n$ in Embodiment 1, 3, or the pattern determining sections 302-0 to 302-$n$, 502-0 to 502-$n$ in Embodiment 2, 4.

Figure 27:
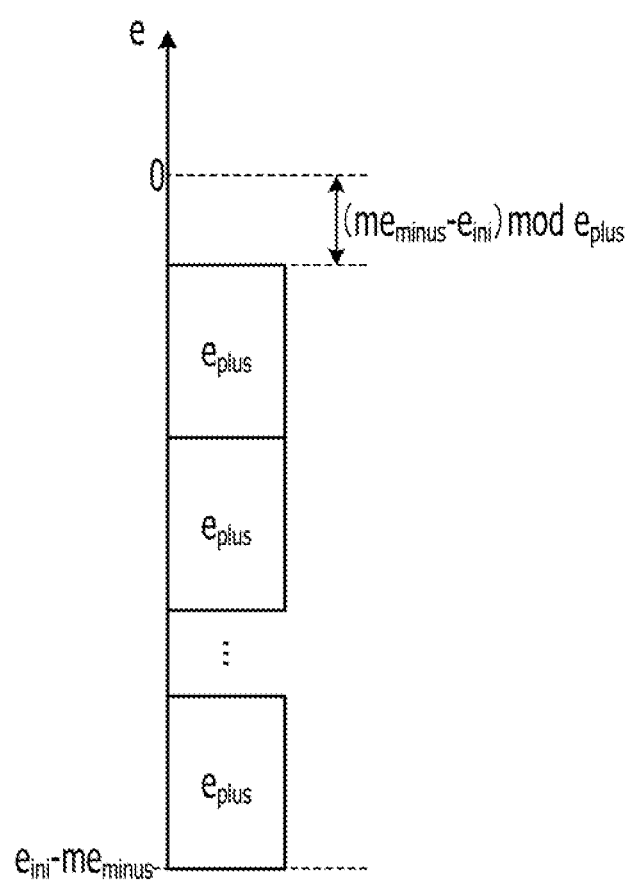
FIG. 27 is a diagram illustrating an exemplary increase/decrease in judgment value.

As described above, in the algorithm according to 3GPP, the decrement value $e_{minus}$ is sequentially subtracted from the judgment value e and puncturing or repetition is performed depending on whether the judgment value e is positive or negative, and if the judgment value e is negative, then the increment value $e_{plus}$ is added. Therefore, the judgment value e with respect to the bit immediately preceding the m-th bit is a value obtained as a result of subtracting the decrement value $e_{minus}$ from the initial value $e_{ini}$, and adding the increment value $e_{plus}$ a number of times equal to the number of times the judgment value e becomes negative. That is, as illustrated in FIG. 27, the difference between the judgment value e and 0 is $(me_{minus}-e_{ini}) \bmod e_{plus}$.

Then, the case in which the judgment value e with respect to the m-th bit becomes negative is when $(me_{minus}-e_{ini}) \bmod e_{plus}$ is smaller than or equal to the decrement value $e_{minus}$. Therefore, by judging whether or not $(me_{minus}-e_{ini}) \bmod e_{plus}$ is smaller than or equal to the decrement value $e_{minus}$, whether or not puncturing or repetition is performed with respect to the m-th bit may be directly judged.

Now, as in Embodiments 1 to 4, letting the number of bits in each of a plurality of blocks of input data be B, the index of each block be i, and the index of each bit within the block be j, the above-mentioned difference may be transformed as follows:

$$tmp(m) = tmp(B \cdot i + j) \qquad (16)$$

$$= \{(B \cdot i + j)e_{minus} - e_{ini}\} \bmod e_{plus}$$

-continued $$= \{(B \cdot i \cdot e_{minus} + j \cdot e_{minus} - e_{ini}\} \bmod e_{plus}$$

$$= \{(B \cdot i \cdot e_{minus}) \bmod e_{plus} + (j \cdot e_{minus} - e_{ini}) \bmod e_{plus}\}$$

$$\bmod e_{plus}$$

$$= \{(i \cdot E_{minus}) \bmod e_{plus} + (j \cdot e_{minus} - e_{ini}) \bmod e_{plus}\}$$

$$\bmod e_{plus}.$$

It should be noted that in Equation (16), $E_{minus}$ is the value as indicated in Equation (5). Then, letting the term with respect to i be $\alpha(i)$, and the term with respect to j be $\beta(j)$, $$\alpha(i) = (i \cdot E_{minus}) \bmod e_{plus} \qquad (17)$$

$$\beta(j) = (j \cdot e_{minus} - e_{ini}) \bmod e_{plus} \qquad (18).$$

Therefore, Equation (16) may be expressed as Equation (19) below.

$$tmp(m) = \{\alpha(i) + \beta(j))\} \bmod e_{plus} \qquad (19)$$

Here, from Equations (17) and (18), $\alpha(i)$ and $\beta(j)$ are each the remainder when a given value is divided by the increment value $e_{plus}$, and hence smaller than the increment value $e_{plus}$. From this, it is appreciated that $\{\alpha(i)+\beta(j)\}$ on the right side of Equation (19) does not exceed twice of the increment value $e_{plus}$ at maximum. Then, since the right side of Equation (19) is the remainder when $\{\alpha(i)+\beta(j)\}$ not exceeding twice of the increment value $e_{plus}$ is divided by the increment value $e_{plus}$, if $\{\alpha(i)+\beta(j)\}$ is smaller than or equal to the increment value $e_{plus}$, Equation (19) becomes as follows.

$$tmp(m) = \alpha(i) + \beta(j)$$

Also, if $\{\alpha(i)+\beta(j)\}$ is larger than the increment value $e_{plus}$, Equation (19) becomes as follows.

$$tmp(m) = \{\alpha(i) + \beta(j)\} - e_{plus}$$

Therefore, by obtaining the parameters $\alpha(i)$ and $\beta(j)$ with respect to every i and every j in advance, the difference tmp (m) used for judging whether or not puncturing or repetition is performed with respect to the m-th bit may be obtained through comparative magnitude judgment and subtraction.

FIG. 28 illustrates an exemplary algorithm in which, by taking advantage of this, whether or not puncturing or repetition is performed is judged from the difference tmp(m), and puncturing or repetition is executed with respect to input data. In the algorithm illustrated in FIG. 28, the above-described tmp is calculated through comparative magnitude judgment and subtraction using the parameters $\alpha(i)$ and $\beta(j)$, and if the difference trip is smaller than or equal to the decrement value $e_{minus}$, the corresponding target bit is punctured or repeated.

In this way, in this embodiment, whether or not puncturing or repetition is performed with respect to an arbitrary bit may be directly judged, and this judgment result may be applied to the bit processing or pattern determination process in Embodiments 1 to 4.

As described above, according to this embodiment, the rate adjustment apparatus previously calculates parameters for individual blocks obtained by dividing input data into a plurality of blocks and for individual bits forming each block by using recurrence equations. Then, from the calculated parameters, the rate adjustment apparatus calculates a parameter for directly judging whether or not puncturing or repetition is performed with respect to an arbitrary bit. Thus, the rate adjustment apparatus may easily judge whether or not each individual bit of input data is to be punctured or repeated.

While the above-mentioned embodiments are directed to a communication system adopting SISO (Single Input Single Output) in which the transmitter 100 and the receiver 200 each has a single antenna, the present invention is not limited to this. That is, the present invention may be also applied to a communication system adopting MIMO (Multi Input Multi Output), in which the receiver and the transmitter each has a plurality of antennas, or transmit diversity or reception diversity. Likewise, for example, the present invention may be also applied to a multi-carrier communication system such as OFDM (Orthogonal Frequency Division Multiplexing).

It is also possible to create a program written in a language allowing a computer to execute the rate adjustment process described in each of the above embodiments. In this case, substantially the same effect as that of each of the above embodiments may be obtained when a computer including a radio communication apparatus executes the program. Further, the same rate adjustment process as that in each of the above embodiments may be implemented by recording the above program onto a computer-readable recording medium, and causing the computer to read and execute the program recorded on this recording medium.

Figure 29:
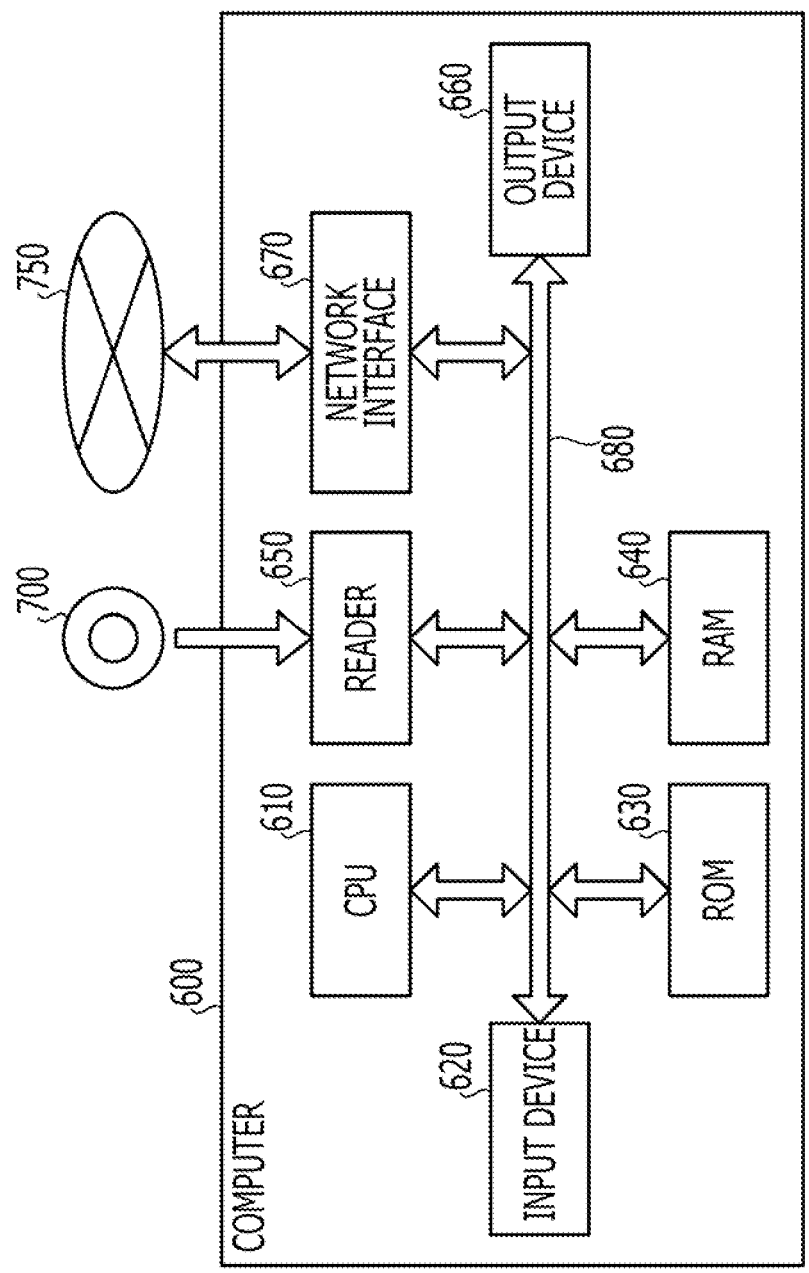
FIG. 29 is a diagram illustrating an exemplary hardware configuration of a computer.

FIG. 29 is a block diagram illustrating an exemplary hardware configuration of a computer 600 that implements a rate adjustment process. As illustrated in FIG. 29, in the computer 600, a CPU 610 that executes the above program, an input device 620 for inputting data, a ROM 630 for storing various kinds of data, a RAM 640 for storing computation parameters and the like, a reader 650 that reads a program from a recording medium 700 recording a program for implementing a rate adjustment process, an output device 660 such as a display, and a network interface 670 that exchanges data with another computer via a network 750 are connected via a bus 680.

The CPU 610 reads the program recorded on the recording medium 700 via the reader 650 and then executes the program, thereby implementing the rate adjustment process. Examples of the recording medium 700 include an optical disk, a flexible disk, a CD-ROM, and a hard disk. Also, this program may be installed into the computer 600 via the network 750. At this time, the network 750 may be either a wireless network or a wired network.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

The invention claimed is:

1. A rate adjustment apparatus, comprising:
a memory; and
a processor coupled to the memory, configured to:
 calculate a first parameter for use as one of a plurality of judgment values;
 sequentially and recursively calculate a second parameter for each of a plurality of processing units into which input data is divided, the second parameter being used as another of the plurality of judgment values; the second parameter being based upon a relationship between two processing units of the plurality of processing units;
 receive the judgment values with respect to a set of bits forming each of the processing units, and deletes bits from or adds bits to the set of bits based on the judgment values;

judge comparative magnitudes of an increment value included in the first parameter, and a computation portion of a recurrence equation corresponding to one of the two processing units with respect to which the relationship between the judgment values is represented by the recurrence equation; and obtain the second parameter for the other processing unit by subtracting the increment value from the computation portion, when it is judged as a result of judgment that the computation portion is larger than the increment value.

2. The rate adjustment apparatus according to claim 1, wherein the processor is further configured to:

execute a plurality of bit processing for each of the plurality of processing units, the plurality of bit processing executing deletion or addition of bits forming each of the processing units in parallel based upon the judgment values; and combine the processing units obtained after the deletion or addition of bits is executed.

3. The rate adjustment apparatus according to claim 1, wherein the processor is further configured to:

execute a plurality of determining for each of the plurality of processing units, to determine patterns each indicating an output order of bits in each of the processing units in parallel based upon the judgment values;

store in the memory the patterns determined; and output bits of input data in accordance with the patterns stored.

4. The rate adjustment apparatus according to claim 1, wherein the processor is configured to calculate the judgment values corresponding to leading bits of the processing units respectively, as the second parameter for each of the processing units.

5. The rate adjustment apparatus according to claim 1, wherein the processor is configured to calculate leading bit parameters corresponding to leading bits of the processing units respectively, and individual bit parameters corresponding to individual bits forming each one of the processing units.

6. The rate adjustment apparatus according to claim 1, wherein the processor is configured to obtain the computation portion as the second parameter for the other of the two processing units, when it is judged as a result of judgment that the computation portion is smaller than the increment value.

7. The rate adjustment apparatus according to claim 1, wherein the processor is configured to judge whether or not to execute deletion or addition of bits by judging whether the judgment values of individual bits are positive or negative.

8. The rate adjustment apparatus according to claim 1, wherein the processor is configured to determine whether to delete or add bits by judging comparative magnitudes of the judgment values of individual bits and a decrement value included in the first parameter.

9. A communication apparatus comprising:

a communication circuitry configured to transmit and receive error correction encoded data; and a processor coupled to the communication circuitry, configured to:

calculate a first parameter for use as one of a plurality of judgment values;

calculate a second parameter for each of a plurality of processing units into which input data is divided, the second parameter being used as another of the plurality of judgment values; the second parameter being based upon a relationship between two processing units of the plurality of processing units;

receive the judgment values with respect to a set of bits forming each of the processing units, and deletes bits from or adds bits to the set of bits based on the judgment values;

judge comparative magnitudes of an increment value included in the first parameter, and a computation portion of a recurrence equation corresponding to one of the two processing units with respect to which the relationship between the judgment values is represented by the recurrence equation; and obtain the second parameter for the other processing unit by subtracting the increment value from the computation portion, when it is judged as a result of judgment that the computation portion is larger than the increment value.

10. A rate adjustment method comprising:

calculating a first parameter for use as one of a plurality of judgment values used;

sequentially and recursively calculating a second parameter for each of a plurality of processing units into which input data is divided, the second parameter being used as another of the plurality of judgment values; the second parameter being based upon a relationship between two processing units of the plurality of processing units;

receiving the judgment values with respect to a set of bits forming each of the processing units;

deleting or adding to the set of bits based on the judgment values;

judging comparative magnitudes of an increment value included in the first parameter; and subtracting the increment value from a computation portion, when it is judged as a result of the judging that the computation portion is larger than the increment value.

11. The rate adjustment method according to claim 10, further comprising:

combining the processing units obtained after the deleting or adding of bits is executed by the plurality of processing units.

12. The rate adjustment method according to claim 10, further comprising:

determining patterns each indicating an output order of bits in each of the processing units in parallel based upon the judgment values;

storing the patterns determined by the determining; and outputting bits of input data in accordance with the patterns stored.

13. The rate adjustment method according to claim 10, further comprising:

calculating the judgment values corresponding to leading bits of the processing units respectively, as the second parameter for each of the processing units.

14. The rate adjustment method according to claim 10, further comprising:

calculating leading bit parameters corresponding to leading bits of the processing units respectively, and individual bit parameters corresponding to individual bits forming each one of the processing units.

15. The rate adjustment method according to claim 10, further comprising:

judging whether the judgment values of individual bits are positive or negative.

16. The rate adjustment method according to claim 10, further comprising:

judging comparative magnitudes of the judgment values of individual bits and a decrement value included in the first parameter.

* * * * *